(12) United States Patent
Senzaki et al.

(10) Patent No.: US 11,943,449 B2
(45) Date of Patent: *Mar. 26, 2024

(54) VIDEO DECODING DEVICE, AND VIDEO ENCODING METHOD PERFORMING ENTROPY-DECODING PROCESS FOR INTER PREDICTION UNIT PARTITION TYPE SYNTAX

(71) Applicant: NEC Corporation, Tokyo (JP)

(72) Inventors: Kenta Senzaki, Tokyo (JP); Yuzo Senda, Tokyo (JP); Keiichi Chono, Tokyo (JP); Hirofumi Aoki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/099,020

(22) Filed: Jan. 19, 2023

(65) Prior Publication Data
US 2023/0156198 A1    May 18, 2023

Related U.S. Application Data

(63) Continuation of application No. 17/066,136, filed on Oct. 8, 2020, now Pat. No. 11,582,461, which is a (Continued)

(30) Foreign Application Priority Data

Jan. 13, 2011 (JP) .................. 2011-004964

(51) Int. Cl.
*H04N 19/103* (2014.01)
*H04N 19/109* (2014.01)
(Continued)

(52) U.S. Cl.
CPC ......... *H04N 19/147* (2014.11); *H04N 19/103* (2014.11); *H04N 19/109* (2014.11);
(Continued)

(58) Field of Classification Search
CPC .......... H04N 19/00575; H04N 19/109; H04N 19/119; H04N 19/147; H04N 19/157;
(Continued)

(56) References Cited

U.S. PATENT DOCUMENTS

2007/0147503 A1  6/2007  Ikeda et al.
2010/0086032 A1  4/2010  Chen et al.
(Continued)

FOREIGN PATENT DOCUMENTS

CN    1701616 A    11/2005
CN    1770867 A    5/2006
(Continued)

OTHER PUBLICATIONS

Chono, Keiichi et al., "Description of video coding technology proposal by NEC Corporation", Joint Collaborative Team on Video Coding (JCT-VC) of ITU-T SG16 WP16 WP3 and ISO/IEC JTC1/SC29/WG11, JCTVC-A104, 1st Meeting: Dresden, DE, Apr. 15-23, 2010, 57 total pages.

(Continued)

*Primary Examiner* — James T Boylan
(74) *Attorney, Agent, or Firm* — Sughrue Mion, PLLC

(57) ABSTRACT

A video decoding device for decoding video using inter prediction includes entropy decoding means for decoding an inter-PU partition type syntax; and decoding control means for making the entropy decoding means decode the inter-PU (Prediction Unit) partition type syntax of a CU (Coding Unit) to be decoded, based on whether the prediction mode of the CU to be decoded is an inter prediction mode and whether a size of the CU to be decoded is equal to a predetermined minimum inter-PU size.

2 Claims, 19 Drawing Sheets

Related U.S. Application Data continuation of application No. 13/979,592, filed as application No. PCT/JP2012/000046 on Jan. 6, 2012, now Pat. No. 10,841,590.

(51) Int. Cl.

| | | |
|---|---|---|
| *H04N 19/119* | (2014.01) | |
| *H04N 19/147* | (2014.01) | |
| *H04N 19/157* | (2014.01) | |
| *H04N 19/176* | (2014.01) | |
| *H04N 19/44* | (2014.01) | |
| *H04N 19/46* | (2014.01) | |
| *H04N 19/503* | (2014.01) | |
| *H04N 19/61* | (2014.01) | |
| *H04N 19/70* | (2014.01) | |
| *H04N 19/65* | (2014.01) | |
| *H04N 19/91* | (2014.01) | |

(52) U.S. Cl.
CPC ......... *H04N 19/119* (2014.11); *H04N 19/157* (2014.11); *H04N 19/176* (2014.11); *H04N 19/44* (2014.11); *H04N 19/46* (2014.11); *H04N 19/503* (2014.11); *H04N 19/61* (2014.11); *H04N 19/70* (2014.11); *H04N 19/65* (2014.11); *H04N 19/91* (2014.11)

(58) Field of Classification Search
CPC .... H04N 19/176; H04N 19/46; H04N 19/503; H04N 19/61; H04N 19/65; H04N 19/70; H04N 19/91
USPC ...................................... 375/240.12
See application file for complete search history.

(56) References Cited

U.S. PATENT DOCUMENTS

| | | | |
|---|---|---|---|
| 2011/0001839 A1 | 1/2011 | Arimura et al. | |
| 2011/0013695 A1 | 1/2011 | Endo | |
| 2011/0194613 A1 | 8/2011 | Chen ................... | H04N 19/107 375/240.24 |
| 2012/0081241 A1 | 4/2012 | Misra et al. | |
| 2012/0082210 A1 | 4/2012 | Chien .................... | H04N 19/13 375/240.02 |
| 2012/0114043 A1* | 5/2012 | Lee ...................... | H04N 19/139 375/E7.125 |
| 2012/0128067 A1 | 5/2012 | Liu ...................... | H04N 19/176 375/240.12 |
| 2012/0308148 A1 | 12/2012 | Kim .................... | H04N 19/463 382/233 |
| 2015/0312588 A1 | 10/2015 | Yamamoto .......... | H04N 19/463 375/240.15 |

FOREIGN PATENT DOCUMENTS

| | | |
|---|---|---|
| CN | 1921630 A | 2/2007 |
| CN | 1937776 A | 3/2007 |
| CN | 101112103 A | 1/2008 |
| CN | 101648086 A | 2/2018 |
| JP | 2009-296363 A | 12/2009 |
| WO | 2004104930 A2 | 12/2004 |
| WO | 2009110741 A2 | 9/2009 |
| WO | 2010039728 A2 | 4/2010 |
| WO | 2011019250 A2 | 2/2011 |
| WO | 2012/017856 A1 | 2/2012 |
| WO | 2012088817 A1 | 5/2012 |
| WO | 2010/002214 A2 | 1/2018 |

OTHER PUBLICATIONS

Communication dated Apr. 13, 2017 from the European Patent Office in counterpart Application No. 15 155 199.1.

Naito, S. et al., "Efficient coding scheme for super high definition video based on extending H.264 high profile", Proceedings of Spie, Spie—International Society for Optical Engineering, US, vol. 6677, No. 67727, Jan. 18, 2006, pp. 1-8, XP002538136.

Chono, Keiichi et al., "Video coding technology proposal by NEC", JCTVC-A104 Meeting, Jointcollaborative Team on Video Coding of ISO/IEC JCT1/SC29/WG11 and ITU-YSG Apr. 16, 2010, 29 pages total, XP030007534.

Communication dated Apr. 14, 2016 from the United States Patent and Trademark Office issued in corresponding U.S. Appl. No. 14/877,453.

Communication dated Jul. 3, 2018 issued by the Japanese Patent Office in counterpart application No. 2017-172889.

Communication dated Oct. 8, 2015 from the State Intellectual Property Office of the People's Republic of China in counterpart application No. 201280005366.4.

Gary Sullivan "Report of VCEG (Question 6/16 "Video coding") activities at SG 16 meeting" International Telecommunications Union, Geneva, Jun. 26-Jul. 6, 2007 (15 pages total).

"Advanced Video Coding" Information technology—Coding of audio-visual objects, ISO/IEC 14496-10, Fifth Edition, May 2009, pp. 1-118.

Communication dated Jan. 5, 2017, from the State Intellectual Property Office of People's Republic of China in counterpart Application No. 201510671048.X.

Communication dated Feb. 27, 2019 from the State Intellectual Property Office of the P.R.C. in counterpart Application No. 201710077103.1.

Han, Woo-Jin et al., "Improved Video Compression Efficiency Through Flexible Unit Representation and Corresponding Extension of Coding Tools", IEEE Transactions of Circuits and Systems for Video Technology, IEEE Service Center, vol. 20, No. 12, Dec. 1, 2010, pp. 1709 to 1728, XP011329409.

Davies, Thomas et al., Video coding technology proposal by BBC (and Samsung), JCTVC Meeting, Jointcollaborative Team on video Coding of ISO/IEC JTC1/SC29/WG11 and ITU-TSG. Apr. 16, 2010, 36 pages total, XP030007576.

Jungsun Kim et al. "Encoding complexity reduction for intra prediction by Disabling NxN Partition" Joint Collaborative Team on Video Coding (JCT-VC) of ITU-T SG16 WP3 and ISO/IEC JCT1/3C29/WG11; 3rd Meeting; Guangzhou, CN, Oct. 7-15, 2010 (7 pages total).

Communication dated Apr. 27, 2015, issued by the Korean Intellectual Property Office in counterpart Korean application No. 10-2013-7016923.

Communication dated Dec. 24, 2016 from the United States Patent Office in related U.S. Appl. No. 14/877,453.

Communication dated Feb. 15, 2018, issued by the Indian Intellectual Property Office in corresponding Indian Application No. 5484/CHENP/2013.

Communication dated Sep. 10, 2015 from the Korean Intellectual Property Office in counterpart application No. 10-2015-7017185.

Communication dated Aug. 22, 2017, from the Japanese Patent Office in counterpart application No. 2016-158609.

"Test Model under Consideration" Joint Collaborative Team on Video Coding (JCT-VC) of ITU-T SG16 WP3 and ISO/IEC JCT1/SC29/WG11, Geneva, CH, Jul. 2010.

Extended European Search Report dated Jun. 12, 2014, issued by the European Patent Office in corresponding European Application No. 12735225.1.

Ken McCann, "Encoder-side description of HEVC Test Model (HM)" Joint Collaborative Team on Video Coding (JCT-VC) of ITU-T SG16 WP3 and ISO/IEC JTC1/SC29/WG11, 3rd Meeting: Guangzhou, CN, Oct. 7-15, 2010 (22 pages total).

Chono et al. (herein after will be referred to as Chono) (Description of video coding technology proposal by NEC) JCTVC-A104, Apr. 16, 2010, 29 Pages.

Anonymous "Test Model Under Construction" Joint Collaborative Team on Video Coding (JCT-VC), Geneva, CH, Jul. 2010.

* cited by examiner

| seq_parameter_set_rbsp( ) { | C | Descriptor |
|---|---|---|
| ... | | |
|    log2_min_coding_unit_size_minus3 | 0 | ue(v) |
|    max_coding_unit_hierarchy_depth | 0 | ue(v) |
| ... | | |
|    min_inter_pred_unit_hierarychy_depth | 0 | ue(v) |
| ... | | |
| } | | |

FIG. 5

| prediction_unit( x0,y0, currPredUnitSize ) { | C | Descriptor |
|---|---|---|
|   if( slice_type !=I ) | | |
|     skip_flag | 2 | u(1) \| ae(1) |
|   if( skip_flag ){ | | |
|     ... | | |
|   } | | |
|   else { | | |
|     if( slice_type !=I ) | | |
|       pred_mode | 2 | u(1) \| ae(1) |
|     if( PredMode == MODE_INTRA ) { | | |
|       ... | | |
|     } | | |
|     else if( PredMode == MODE_INTER ) { | | |
|       if( currPredCodingUnitSize > minInterPredUnitSize ) | | |
|         inter_partitioning_idc | 2 | ue(v) \| ae(v) |
|       ... | | |
|     } | | |
|     else if( PredMode == MODE_DIRECT ) { | | |
|       ... | | |
|     } | | |
|   } | | |

FIG. 8

| pic_parameter_set_rbsp( ) { | C | Descriptor |
|---|---|---|
| ... | | |
|    min_inter_pred_unit_hierarchy_depth | 0 | ue(v) |
| ... | | |
| } | | |

FIG. 9

| slice_header( ) { | C | Descriptor |
|---|---|---|
| ... | | |
|    min_inter_pred_unit_hierarchy_depth | 0 | ue(v) |
| ... | | |
| } | | |

(b) PREDICTION DIRECTION
2:DC(MEAN VALUE)

(a) Intra_4x4 a=(Y+2A+B+2)/4
b=(A+2B+C+2)/4
c=(B+2C+D+2)/4

(c) Intra_8x8

(a) Intra_16x16  (b) PREDICTION DIRECTION

FIG. 20

FIG. 22
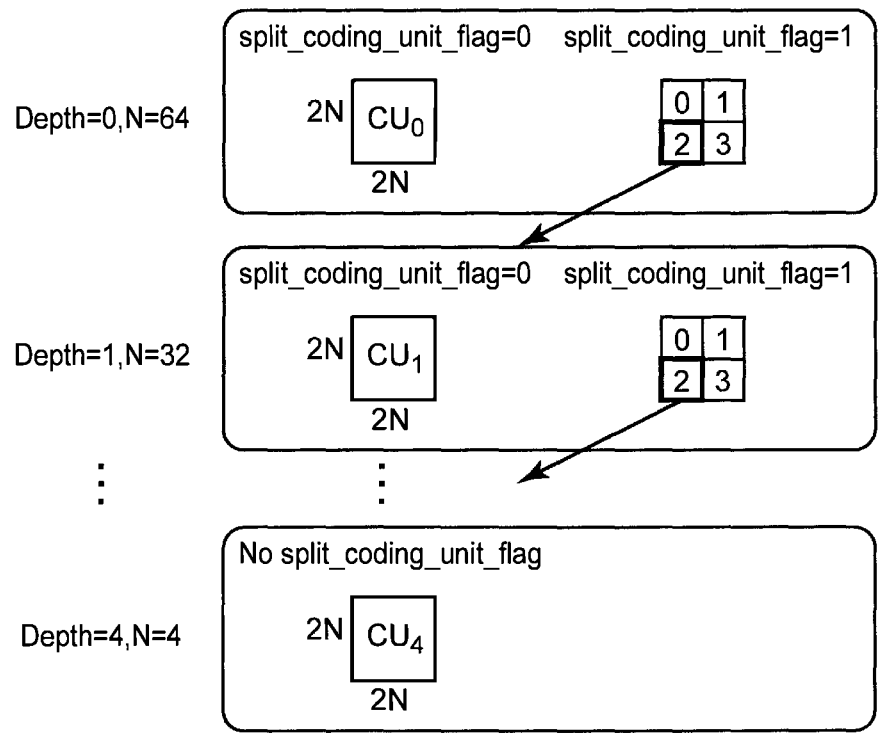
FIG. 23
|  |  |  |  |
|---|---|---|---|
| 2N x 2N | 2N x N | N x 2N | N x N |
| 2N x nU | 2N x nD | nL x 2N | nR x 2N |
FIG. 24
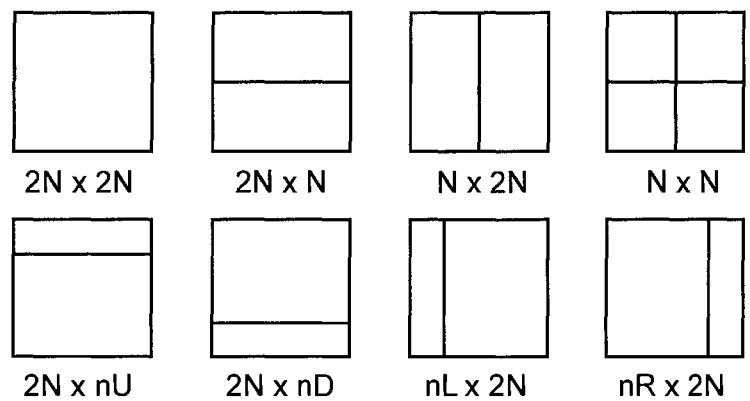

(A)

(B)

VIDEO DECODING DEVICE, AND VIDEO ENCODING METHOD PERFORMING ENTROPY-DECODING PROCESS FOR INTER PREDICTION UNIT PARTITION TYPE SYNTAX

CROSS REFERENCE TO RELATED APPLICATIONS

This application is a Continuation of U.S. patent application Ser. No. 17/066,136 filed Oct. 8, 2020, which is a Continuation of U.S. patent application Ser. No. 13/979,592 filed Aug. 26, 2013, which is a National Stage of International Application No. PCT/JP2012/000046 filed Jan. 5, 2012, claiming priority based on Japanese Patent Application No. 2011-004964 filed Jan. 13, 2011, the contents of all of which are incorporated herein by reference in their entirety.

TECHNICAL FIELD

The present invention relates to a video encoding device, a video decoding device, a video encoding method, a video decoding method, and a program that use hierarchical coding units.

BACKGROUND ART

Non Patent Literature (NPL) 1 discloses typical video encoding system and video decoding system.

A video encoding device described in NPL 1 has a structure as shown in FIG. 15. The video encoding device shown in FIG. 15 is called a typical video encoding device below.

Referring to FIG. 15, the structure and operation of the typical video encoding device that receives each frame of digitized video as input and outputs a bitstream are described below.

The video encoding device shown in FIG. 15 includes a transformer/quantizer 101, an entropy encoder 102, an inverse transformer/inverse quantizer 103, a buffer 104, a predictor 105, a multiplexer 106, and an encoding controller 108.

The video encoding device shown in FIG. 15 divides each frame into blocks of 16×16 pixel size called macro blocks (MBs), and encodes each MB sequentially from top left of the frame.

FIG. 16 is an explanatory diagram showing an example of block division in the case where the frame has a spatial resolution of QCIF (Quarter Common Intermediate Format). The following describes the operation of each unit while focusing only on pixel values of luminance for simplicity's sake.

A prediction signal supplied from the predictor 105 is subtracted from the block-divided input video, and the result is input to the transformer/quantizer 101 as a prediction error image. There are two types of prediction signals, namely, an intra prediction signal and an inter prediction signal. The inter prediction signal is also called an inter-frame prediction signal.

Each of the prediction signals is described below. The intra prediction signal is a prediction signal generated based on an image of a reconstructed picture that has the same display time as a current picture stored in the buffer 104.

Referring to 8.3.1 Intra_4×4 prediction process for luma samples, 8.3.2 Intra_8×8 prediction process for luma samples, and 8.3.3 Intra_16×16 prediction process for luma samples in NPL 1, intra prediction of three block sizes, i.e. Intra_4×4, Intra_8×8, and Intra_16×16, are available.

Intra_4×4 and Intra_8×8 are respectively intra prediction of 4×4 block size and 8×8 block size, as can be understood from (a) and (c) in FIG. 17. Each circle (o) in the drawing represents a reference pixel used for intra prediction, i.e., a pixel of the reconstructed picture having the same display time as the current picture.

In intra prediction of Intra_4×4, reconstructed peripheral pixels are directly set as reference pixels, and used for padding (extrapolation) in nine directions shown in (b) of FIG. 17 to form the prediction signal. In intra prediction of Intra_8×8, pixels obtained by smoothing peripheral pixels of the image of the reconstructed picture by low-pass filters (½, ¼, ½) shown under the right arrow in (c) of FIG. 17 are set as reference pixels, and used for extrapolation in the nine directions shown in (b) of FIG. 17 to form the prediction signal.

Similarly, Intra_16×16 is intra prediction of 16×16 block size, as can be understood from (a) in FIG. 18. Like in FIG. 17, each circle (o) in the drawing represents a reference pixel used for intra prediction, i.e., a pixel of the reconstructed picture having the same display time as the current picture. In intra prediction of Intra_16×16, peripheral pixels of the image of the reconstructed picture are directly set as reference pixels, and used for extrapolation in four directions shown in (b) of FIG. 18 to form the prediction signal.

Hereafter, an MB and a block encoded using the intra prediction signal are called an intra MB and an intra block, respectively, i.e., a block size of intra prediction is called an intra prediction block size, and a direction of extrapolation is called an intra prediction direction. The intra prediction block size and the intra prediction direction are prediction parameters related to intra prediction.

The inter prediction signal is a prediction signal generated from an image of a reconstructed picture different in display time from the one the current picture has and is stored in the buffer 104. Hereafter, an MB and a block encoded using the inter prediction signal are called an inter MB and an inter block, respectively. A block size of inter prediction (inter prediction block size) can be selected from, for example, 16×16, 16×8, 8×16, 8×8, 8×4, 4×8, and 4×4.

FIG. 19 is an explanatory diagram showing an example of inter prediction using 16×16 block size. A motion vector MV=($mv_x$, $mv_y$) shown in FIG. 19 is a prediction parameter of inter prediction, which indicates the amount of parallel translation of an inter prediction block (inter prediction signal) of a reference picture relative to a block to be encoded. In AVC, prediction parameters of inter prediction include not only a direction of inter prediction representing a direction of the reference picture of an inter prediction signal relative to a picture to be encoded of the block to be encoded, but also a reference picture index for identifying the reference picture used for inter prediction of the block to be encoded. This is because, in AVC, multiple reference pictures stored in the buffer 104 can be used for inter prediction.

In AVC inter prediction, a motion vector can be calculated at ¼-pixel accuracy. FIG. 20 is an explanatory diagram showing interpolation processing for luminance signals in motion-compensated prediction. In FIG. 20, A represents a pixel signal at an integer pixel position, b, c, d represent pixel signals at decimal pixel positions with ½-pixel accuracy, and $e_1$, $e_2$, $e_3$ represent pixel signals at decimal pixel positions with ¼-pixel accuracy. The pixel signal b is generated by applying a six-tap filter to pixels at horizontal integer pixel positions. Likewise, the pixel signal c is generated by applying the six-tap filter to pixels at vertical integer pixel positions. The pixel signal d is generated by applying the six-tap filter to pixels at horizontal or vertical decimal pixel positions with ½-pixel accuracy. The coefficients of the six-tap filter are represented as [1, −5, 20, 20, −5, 1]/32. The pixel signals $e_1$, $e_2$, and $e_3$ are generated by applying a two-tap filter [1, 1]/2 to pixels at neighboring integer pixel positions or decimal pixel positions, respectively.

A picture encoded by including only intra MBs is called an I picture. A picture encoded by including not only intra MBs but also inter MBs is called a P picture. A picture encoded by including inter MBs that use not only one reference picture but two reference pictures simultaneously for inter prediction is called a B picture. In the B picture, inter prediction in which the direction of the reference picture of the inter prediction signal relative to the picture to be encoded of the block to be encoded is past is called forward prediction, inter prediction in which the direction of the reference picture of the inter prediction signal relative to the picture to be encoded of the block to be encoded is future is called backward prediction, and inter prediction simultaneously using two reference pictures involving both the past and the future is called bidirectional prediction. The direction of inter prediction (inter prediction direction) is a prediction parameter of inter prediction.

In accordance with an instruction from the encoding controller 108, the predictor 105 compares an input video signal with a prediction signal to determine a prediction parameter that minimizes the energy of a prediction error image block. The encoding controller 108 supplies the determined prediction parameter to the entropy encoder 102.

The transformer/quantizer 101 frequency-transforms the image (prediction error image) from which the prediction signal has been subtracted to get a frequency transform coefficient.

The transformer/quantizer 101 further quantizes the frequency transform coefficient with a predetermined quantization step width Qs. Hereafter, the quantized frequency transform coefficient is called a transform quantization value.

The entropy encoder 102 entropy-encodes the prediction parameters and the transform quantization value. The prediction parameters are information associated with MB and block prediction, such as prediction mode (intra prediction, inter prediction), intra prediction block size, intra prediction direction, inter prediction block size, and motion vector mentioned above.

The inverse transformer/inverse quantizer 103 inverse-quantizes the transform quantization value with the predetermined quantization step width Qs. The inverse transformer/inverse quantizer 103 further performs inverse frequency transform of the frequency transform coefficient obtained by the inverse quantization. The prediction signal is added to the reconstructed prediction error image obtained by the inverse frequency transform, and the result is supplied to the buffer 104.

The buffer 104 stores the reconstructed image supplied. The reconstructed image for one frame is called a reconstructed picture.

The multiplexer 106 multiplexes and outputs the output data of the entropy encoder 102 and coding parameters.

Based on the operation described above, the multiplexer 106 in the video encoding device generates a bitstream.

A video decoding device described in NPL 1 has a structure as shown in FIG. 21. Hereafter, the video decoding device shown in FIG. 21 is called a typical video decoding device.

Referring to FIG. 21, the structure and operation of the typical video decoding device that receives the bitstream as input and outputs a decoded video frame is described.

The video decoding device shown in FIG. 21 includes a de-multiplexer 201, an entropy decoder 202, an inverse transformer/inverse quantizer 203, a predictor 204, and a buffer 205.

The de-multiplexer 201 de-multiplexes the input bitstream and extracts an entropy-encoded video bitstream.

The entropy decoder 202 entropy-decodes the video bitstream. The entropy decoder 202 entropy-decodes the MB and block prediction parameters and the transform quantization value, and supplies the results to the inverse transformer/inverse quantizer 203 and the predictor 204.

The inverse transformer/inverse quantizer 203 inverse-quantizes the transform quantization value with the quantization step width. The inverse transformer/inverse quantizer 203 further performs inverse frequency transform of the frequency transform coefficient obtained by the inverse quantization.

After the inverse frequency transform, the predictor 204 generates a prediction signal using an image of a reconstructed picture stored in the buffer 205 based on the entropy-decoded MB and block prediction parameters.

After the generation of the prediction signal, the prediction signal supplied from the predictor 204 is added to a reconstructed prediction error image obtained by the inverse frequency transform performed by the inverse transformer/inverse quantizer 203, and the result is supplied to the buffer 205 as a reconstructed image.

Then, the reconstructed picture stored in the buffer 205 is output as a decoded image (decoded video).

Based on the operation described above, the typical video decoding device generates the decoded image.

CITATION LIST

Non Patent Literatures

NPL 1: ISO/IEC 14496-10 Advanced Video Coding
NPL 2: "Test Model under Consideration," Document: JCTVC-B205, Joint Collaborative Team on Video Coding (JCT-VC) of ITU-T SG16 WP3 and ISO/IEC JTC1/SC29/WG11 2nd Meeting: Geneva, CH, 21-28 Jul. 2010

SUMMARY OF INVENTION

Technical Problem

NPL 2 discloses Test Model under Consideration (TMuC). Unlike that disclosed in NPL 1, the TMuC uses hierarchical coding units (Coding Tree Blocks (CTBs)) shown in FIG. 22. In this specification, CTB blocks are called Coding Units (CUs).

Here, the largest CU is called the Largest Coding Unit (LCU), and the smallest CU is called the Smallest Coding Unit (SCU). In the TMuC scheme, the concept of Prediction Unit (PU) is introduced as a unit of prediction for each CU (see FIG. 23). The PU is a basic unit of prediction, and eight PU partition types {2N×2N, 2N×N, N×2N, N×N, 2N×nU, 2N×nD, nL×2N, nR×2N} shown in FIG. 23 are defined. The PU used for inter prediction is called an inter PU and the PU used for intra prediction is called intra PU. The PU partition for which inter prediction is used is called inter-PU partition, and the PU partition for which intra prediction is used is called intra-PU partition. Among the shapes shown in FIG. 23, only the squares of 2N×2N and N×N are supported as the intra-PU partitions. Hereafter, the lengths of one side of a CU and a PU are called CU size and PU size, respectively.

The TMuC scheme can use a filter with up to twelve taps to seek for a predicted image with a decimal accuracy. The relationship between pixel position and filter coefficient is as follows.

TABLE 1

| Pixel Position | Filter Coefficient |
| --- | --- |
| 1/4 | {−1, 5, −12, 20, −40, 229, 76, −32, 16, −8, 4, −1} |
| 1/2 | {−1, 8, −16, 24, −48, 161, 161, −48, 24, −16, 8, −1} |
| 3/4 | {−1, 4, −8, 16, −32, 76, 229, −40, 20, −12, 5, −1} |

The pixel position is described with reference to FIG. 24. In FIG. 24, it is assumed that A and E are pixels at integer pixel positions. In this case, b is a pixel at ¼-pixel position, c is a pixel at ½-pixel position, and d is a pixel at ¾ pixel position. The same applies to those in the vertical direction.

The pixel b or pixel c shown in FIG. 20 is generated by applying a filter for horizontal or vertical ½-pixel position once. The pixel et is generated by applying a filter for ¼-pixel position once.

Referring to FIG. 25, a description is made of an example of generation of decimal pixels, such as pixel $e_2$ and pixel $e_3$, the pixel positions of which are decimal-accuracy positions in both the horizontal and vertical directions and at least either of which is ¼-pixel position. In FIG. 25, it is assumed that pixel A is a pixel at an integer pixel position and pixel c is a pixel at a decimal pixel position to be obtained. In this case, pixel b is first generated by applying a filter for vertical ¼-pixel position. Then, pixel c is generated by applying a filter for horizontal ¾ pixel position relative to the decimal pixel b. In 8.3 Interpolation Methods of NPL 2, the generation of decimal pixels is described in more detail.

In the TMuC scheme, a syntax indicative of a PU partition type in each PU header of CUs on all the levels (according to 4.1.10 Prediction unit syntax in NPL 2, intra_split_flag in the case of intra prediction and inter_partitioning_idc in the case of inter prediction) is embedded in an output bitstream. Hereafter, intra_split_flag syntax is called an intra-PU partition type syntax, and inter_partitioning_idc syntax is called an inter-PU partition type syntax.

When many small-size CUs exist within each LCU, the ratio of the number of bits of the inter-PU partition type syntax included in the bitstream increases, causing a problem that the quality of compressed video is reduced.

Further, in the TMuC scheme, memory accesses to reference pictures increase as the size of the inter-PU partition becomes smaller, causing a problem of straining the memory bandwidth. Particularly, since the twelve-tap filter is used to generate a decimal pixel in the TMuC scheme, the memory bandwidth is more strained.

FIG. 26 is an explanatory diagram for describing memory access areas when the twelve-tap filter is used. FIG. 26(A) shows a memory access area of one inter-PU partition when the PU partition type of N×N is selected, and FIG. 26(B) shows a memory access area when the inter-PU partition type of 2N×2N is selected.

When N×N is selected, since memory access of a size surrounded by the broken line in FIG. 26(A) is performed four times in total for each of inter-PU partitions 0, 1, 2, 3, the amount of memory access has a value obtained by multiplying $4(N+11)^2=4N^2+88N+484$ by the bit count of a reference picture. Since the amount of memory access of the 2N×2N inter-PU partition has a value obtained by multiplying $(2N+11)^2=4N^2+44N+121$ by the bit count of the reference picture, the amount of memory access of the N×N inter-PU partition becomes greater than the amount of memory access of 2N×2N.

For example, the amount of memory access of inter PUs in an 8×8 CU when N=4, the prediction is one-way prediction, and the bit accuracy of each pixel value is 8 bits is considered. The amount of memory access in the 2N×2N inter-PU partition is 19×19×1×8 bits=2888 bits, while the amount of memory access in the N×N inter-PU partition is 15×15×4×8 bits=7200 bits, whose amount of memory access is about 2.5 times.

In units of LCU, if the block size of LCU is 128×128, the amount of memory access when the LCU is predicted by one inter-PU partition will be 139×139×1×8 bits=154568 bits, while the amount of memory access when the LCU is all predicted by 4×4 inter-PU partitions (i.e., when the LCU is predicted by 1024 inter-PU partitions) will be 15×15×1024×8 bits=1843200 bits, whose amount of memory access is about twelve times.

It is an object of the present invention to reduce the memory bandwidth per predetermined area.

Solution to Problem

A video decoding device for decoding video using inter prediction includes entropy decoding means for decoding an inter-PU partition type syntax; and decoding control means for making the entropy decoding means decode the inter-PU (Prediction Unit) partition type syntax of a CU (Coding Unit) to be decoded, based on whether the prediction mode of the CU to be decoded is an inter prediction mode and whether a size of the CU to be decoded is equal to a predetermined minimum inter-PU size.

A video decoding method for decoding video using inter prediction, includes entropy-decoding an inter-PU partition type syntax; and making an entropy-decoding process decode the inter-PU (Prediction Unit) partition type syntax of a CU (Coding Unit) to be decoded, based on whether the prediction mode of the CU to be decoded is an inter prediction mode and whether a size of the CU to be decoded is equal to a predetermined minimum inter-PU size.

Advantageous Effects of Invention

According to the present invention, the use of small inter-PU partitions can be restricted to reduce the memory bandwidth.

BRIEF DESCRIPTION OF DRAWINGS

FIG. 5 is an explanatory diagram of a list indicative of information on inter_partitioning_idc syntax in a PU syntax.

FIG. 8 is an explanatory diagram of a list indicative of information on the minimum inter-PU size in a picture parameter set.

FIG. 9 is an explanatory diagram of a list indicative of information on the minimum inter-PU size in a slice header.

Figure 20:
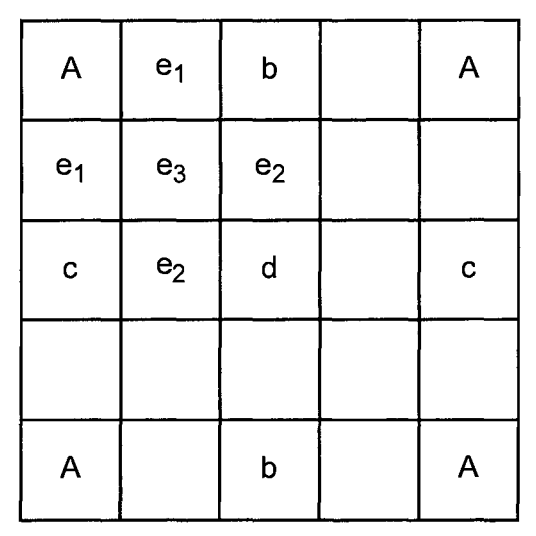

FIG. 20 is an explanatory diagram showing interpolation processing for luminance signals in motion-compensated prediction.

FIG. 22 is an explanatory diagram for describing a CTB.

FIG. 23 is an explanatory diagram for describing a PU.

FIG. 24 is an explanatory diagram for describing decimal pixel positions.

DESCRIPTION OF EMBODIMENTS

In order to solve the technical problems of the above-mentioned typical techniques, the present invention restricts inter-PU partitions based on the CU depth (i.e. CU size) in video encoding using hierarchical coding units to solve the problems. In an example of the present invention, the CU size capable of using inter-PU partitions other than 2N×2N is restricted to solve the problems. In another example of the present invention, transmission of an inter-PU partition type syntax in a PU header is restricted to solve the problems. In the above example of the present invention, the ratio of the number of bits of the inter-PU partition type syntax included in a bitstream can be kept low to suppress the memory bandwidth while improving the quality of compressed video.

Exemplary Embodiment 1

Exemplary Embodiment 1 shows a video encoding device including: encoding control means for controlling an inter-PU partition type based on a predetermined minimum inter-PU size set from the outside; and means for embedding, in a bitstream, information on the minimum inter-PU size to signal the information on the minimum inter-PU size to a video decoding device.

In this exemplary embodiment, it is assumed that available CU sizes are 128, 64, 32, 16, and 8 (i.e., the LCU size is 128 and the SCU size is 8), and the minimum inter-PU size (minInterPredUnitSize) is 8.

It is further assumed in the exemplary embodiment that the information on the minimum inter-PU size (min_inter_pred_unit_hierarchy_depth) is base-2 log (logarithm) of a value obtained by dividing the minimum inter-PU size (8) by the SCU size (8). Thus, in the exemplary embodiment, the value of min_inter_pred_unit_hierarchy_depth multiplexed into the bitstream is 0 (=$\log_2(8/8)$).

Figure 1:
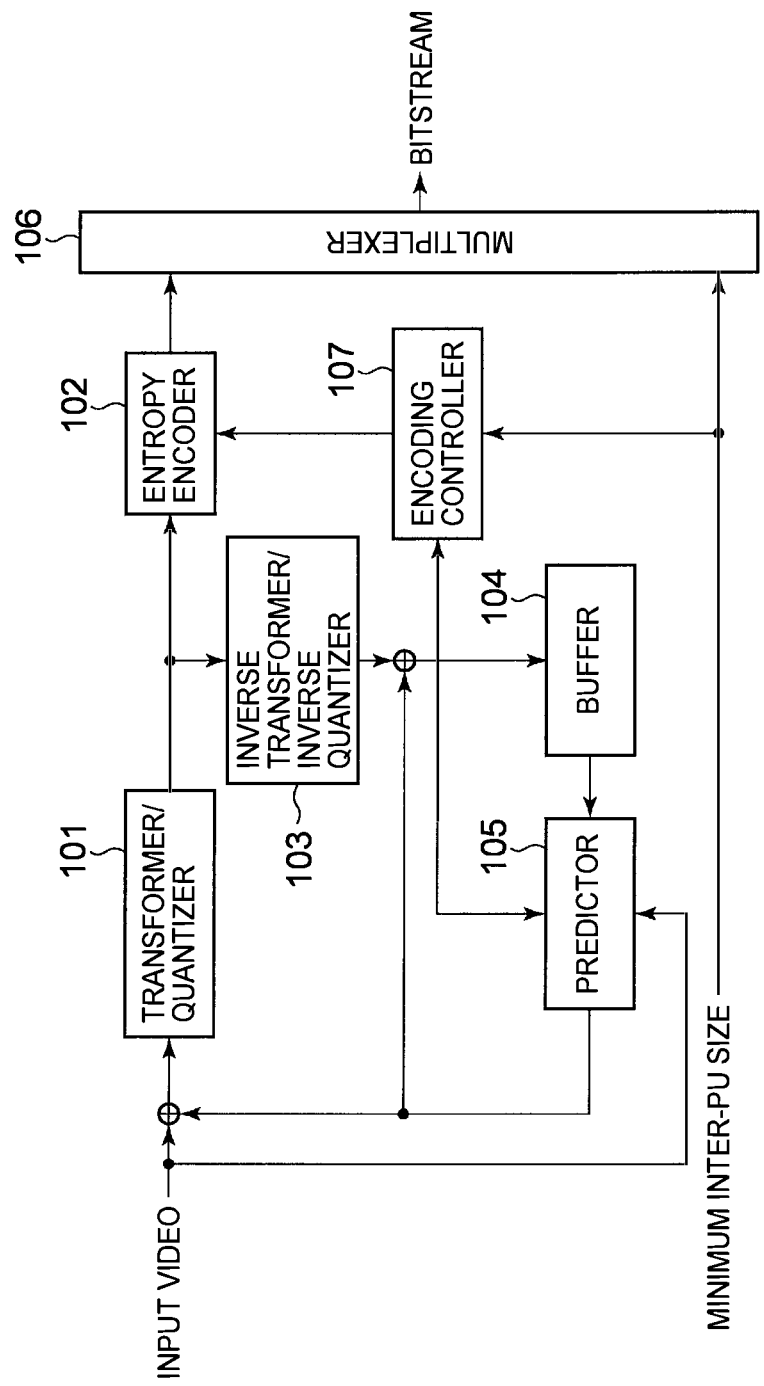
FIG. 1 is a block diagram of a video encoding device in Exemplary Embodiment 1.
Figure 15:
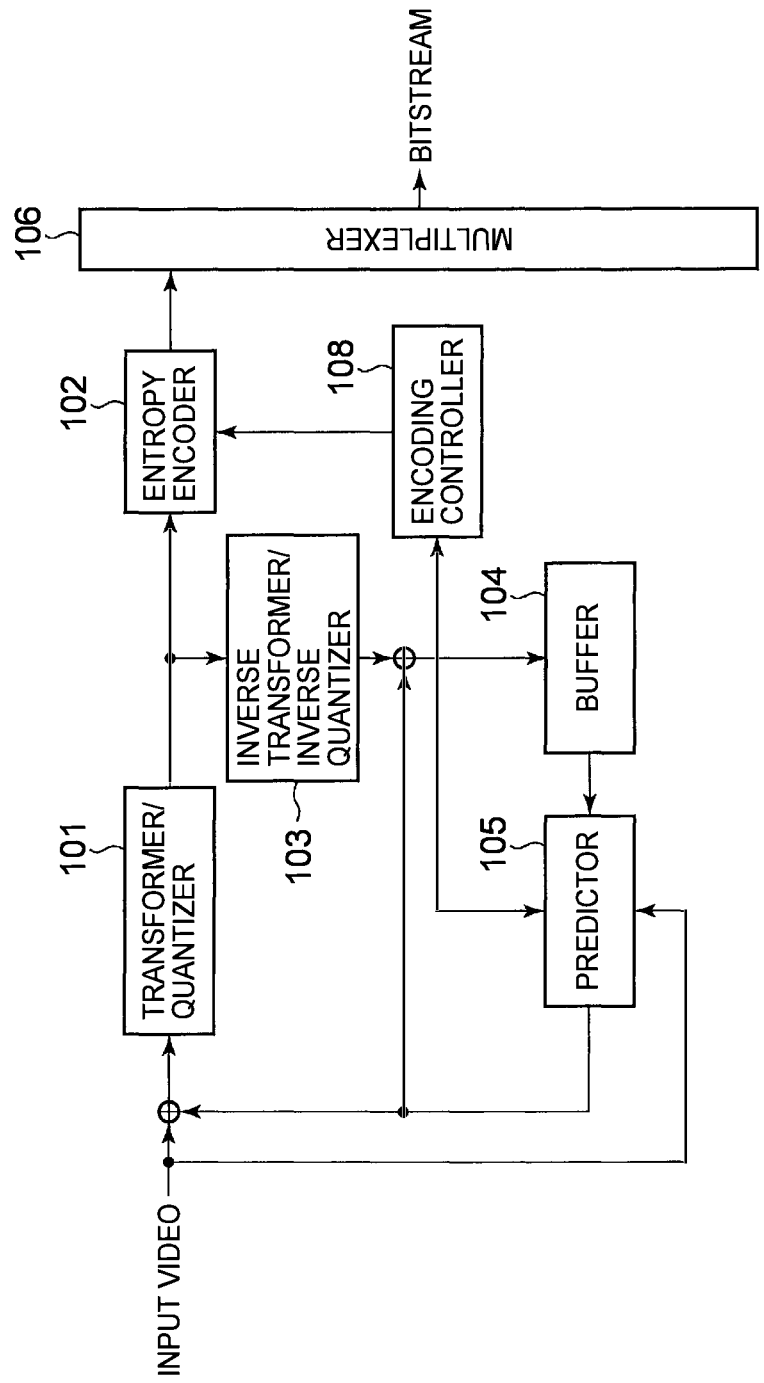
FIG. 15 is a block diagram of a typical video encoding device.
Figure 16:
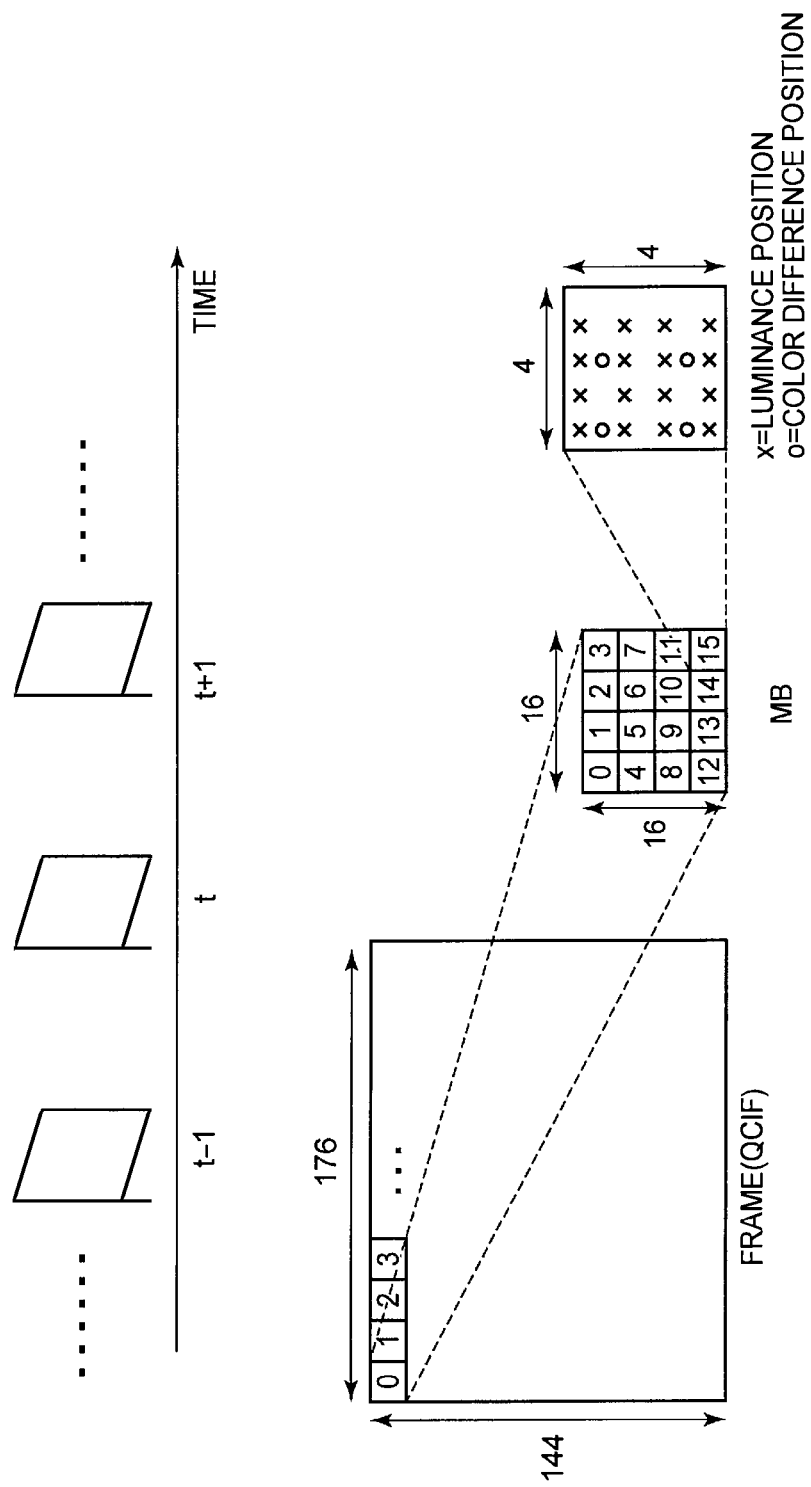
FIG. 16 is an explanatory diagram showing an example of block division.
Figure 17:
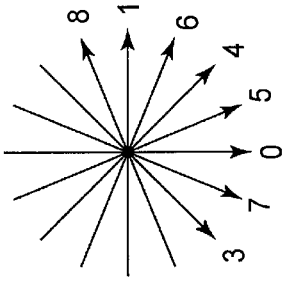
FIG. 17 is an explanatory diagram for describing intra prediction of Intra_4×4 and Intra_8×8.
Figure 17:
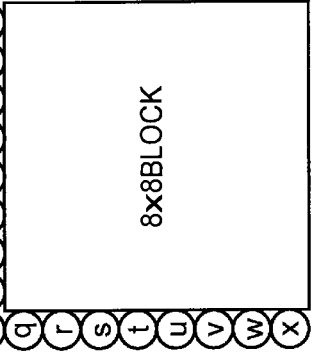
Figure 17:
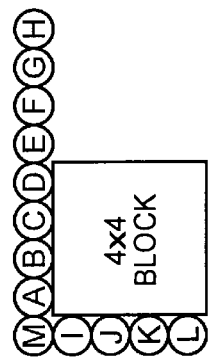
Figure 17:
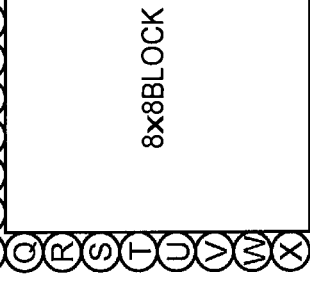
Figure 18:
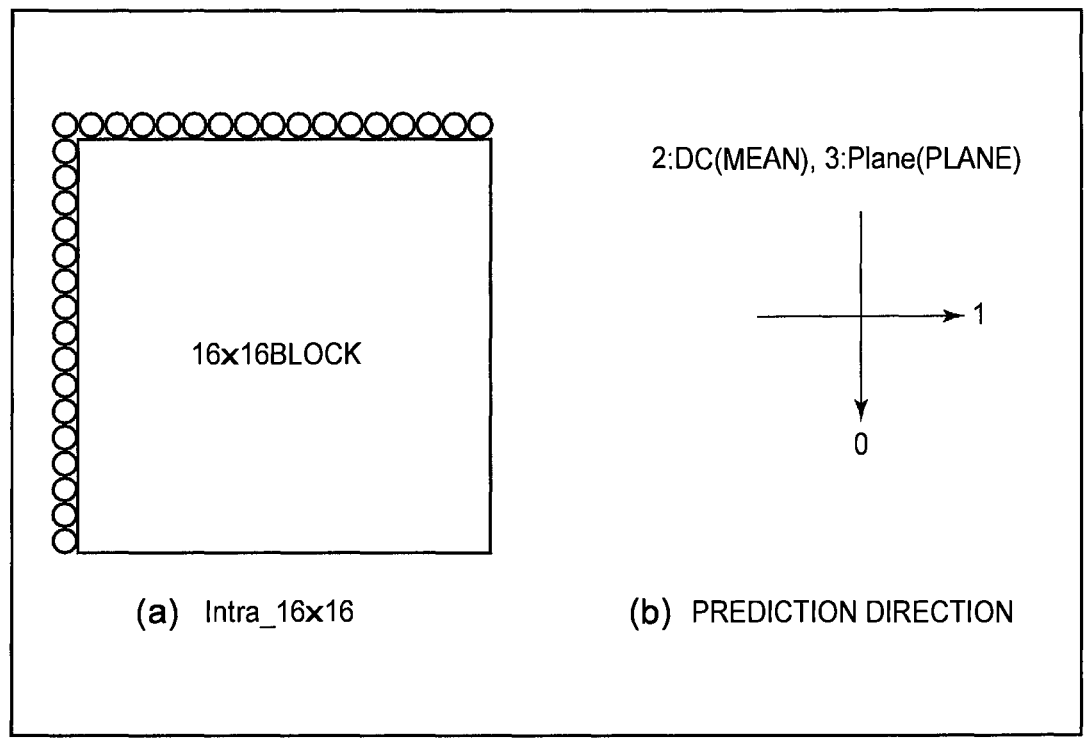
FIG. 18 is an explanatory diagram for describing intra prediction of Intra_16×16.
Figure 19:
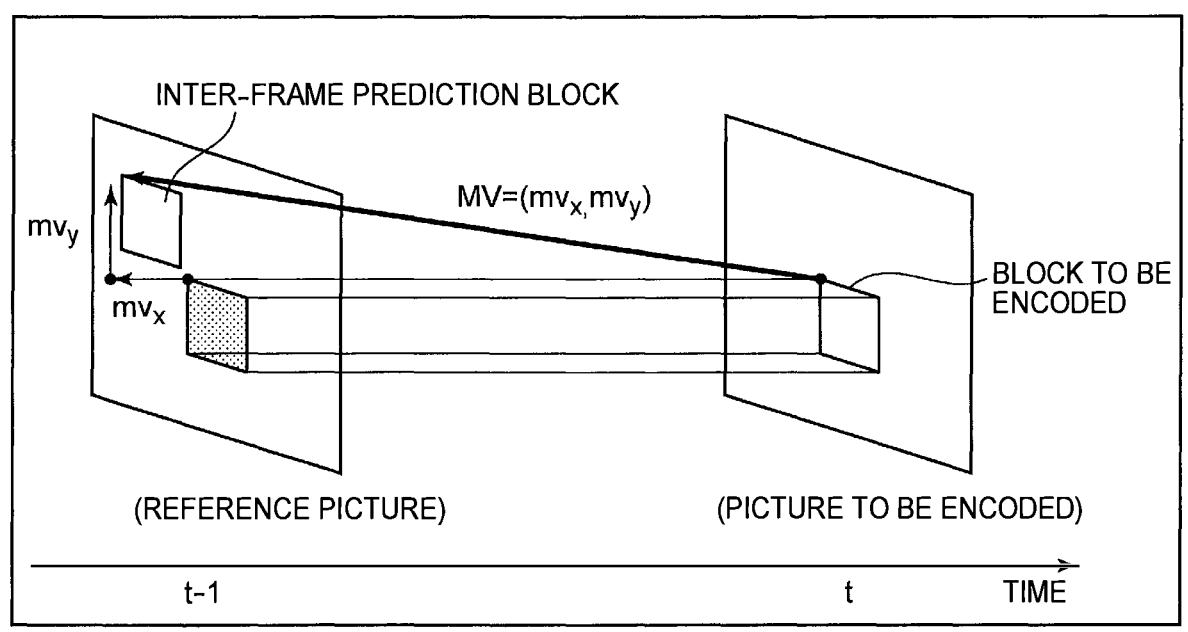
FIG. 19 is an explanatory diagram showing an example of inter prediction.
Figure 21:
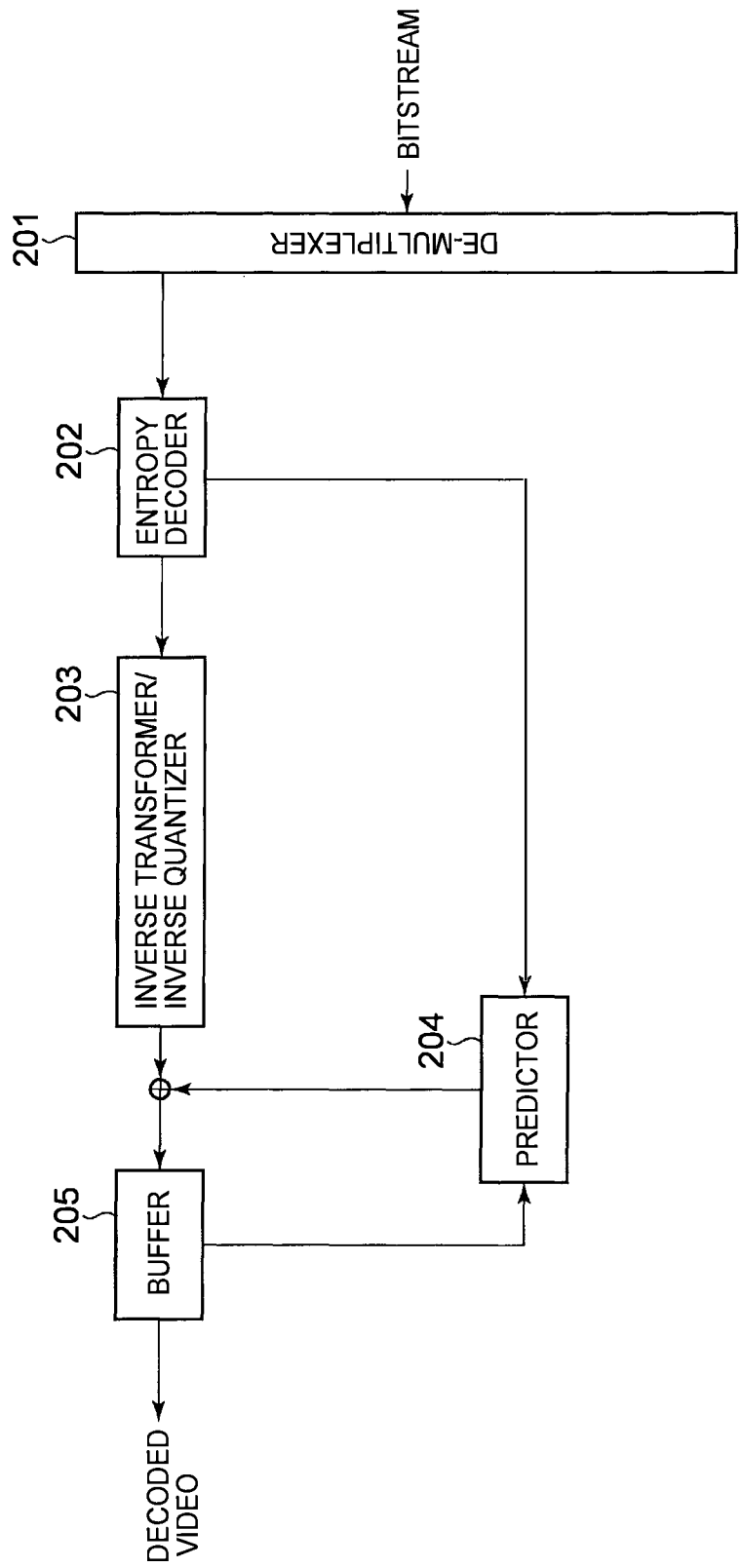
FIG. 21 is a block diagram of a typical video decoding device.
Figure 25:
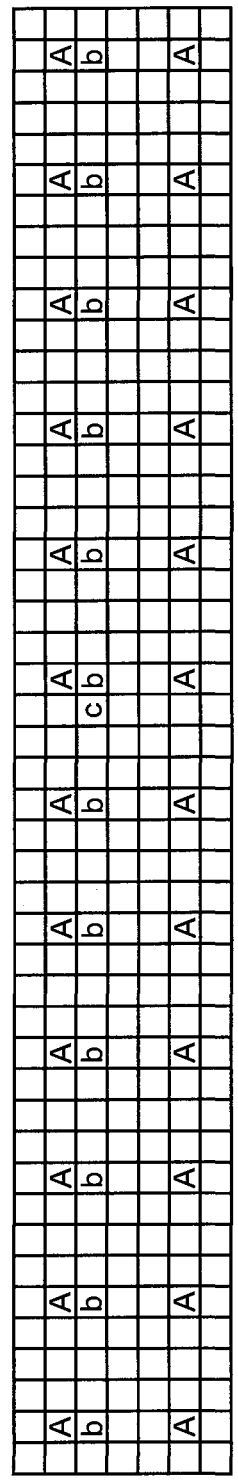
FIG. 25 is an explanatory diagram for describing a decimal pixel generation method using a twelve-tap filter in a TMuC scheme.
Figure 26:
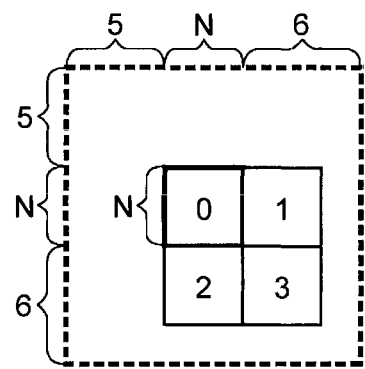
FIG. 26 is an explanatory diagram for describing a memory access range when a decimal pixel is generated using the twelve-tap filter.
Figure 26:
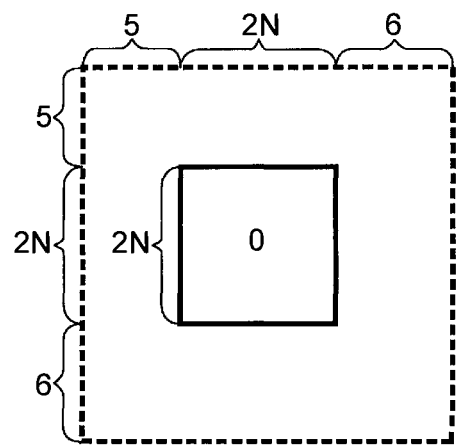

As shown in FIG. 1, the video encoding device in the exemplary embodiment includes a transformer/quantizer 101, an entropy encoder 102, an inverse transformer/inverse quantizer 103, a buffer 104, a predictor 105, a multiplexer 106, and an encoding controller 107, like the typical video encoding device shown in FIG. 15.

The video encoding device in the exemplary embodiment shown in FIG. 1 differs from the video encoding device shown in FIG. 15 in that minInterPredUnitSize is supplied to the encoding controller 107 to transmit an inter-PU partition type syntax in a CU size greater than minInterPredUnitSize, and minInterPredUnitSize is also supplied to the multiplexer 106 to signal minInterPredUnitSize to the video decoding device.

The encoding controller 107 has the predictor 105 calculate a cost (Rate-Distortion cost: R-D cost) calculated from a coding distortion (the energy of an error image between an input signal and a reconstructed picture) and a generated bit count. The encoding controller 107 determines a CU splitting pattern in which the R-D cost is minimized (the splitting pattern determined by split_coding_unit_flag as shown in FIG. 22), and prediction parameters of each CU. The encoding controller 107 supplies determined split_coding_unit_flag and the prediction parameters of each CU to the predictor 105 and the entropy encoder 102. The prediction parameters are information associated with prediction of a CU to be encoded, such as prediction mode (pred_mode), intra-PU partition type (intra_split_flag), intra prediction direction, inter-PU partition type (inter_partitioning_idc), and motion vector.

As an example, the encoding controller 107 in the exemplary embodiment selects the optimum PU partition type as a prediction parameter for a CU whose size is greater than minInterPredUnitSize from a total of ten types of intra prediction {2N×2N, N×N}, and inter prediction {2N×2N, 2N×N, N×2N, N×N, 2N×nU, 2N×nD, nL×2N, nR×2N}. For a CU whose size is equal to minInterPredUnitSize, the encoding controller 107 selects the optimum PU partition type as a prediction parameter from a total of three types of intra prediction {2N×2N, N×N} and inter prediction {2N×2N}. For a CU whose size is less than minInterPredUnitSize, the encoding controller 107 selects the optimum PU partition type as a prediction parameter from two types of intra prediction {2N×2N, N×N}.

Figure 2:
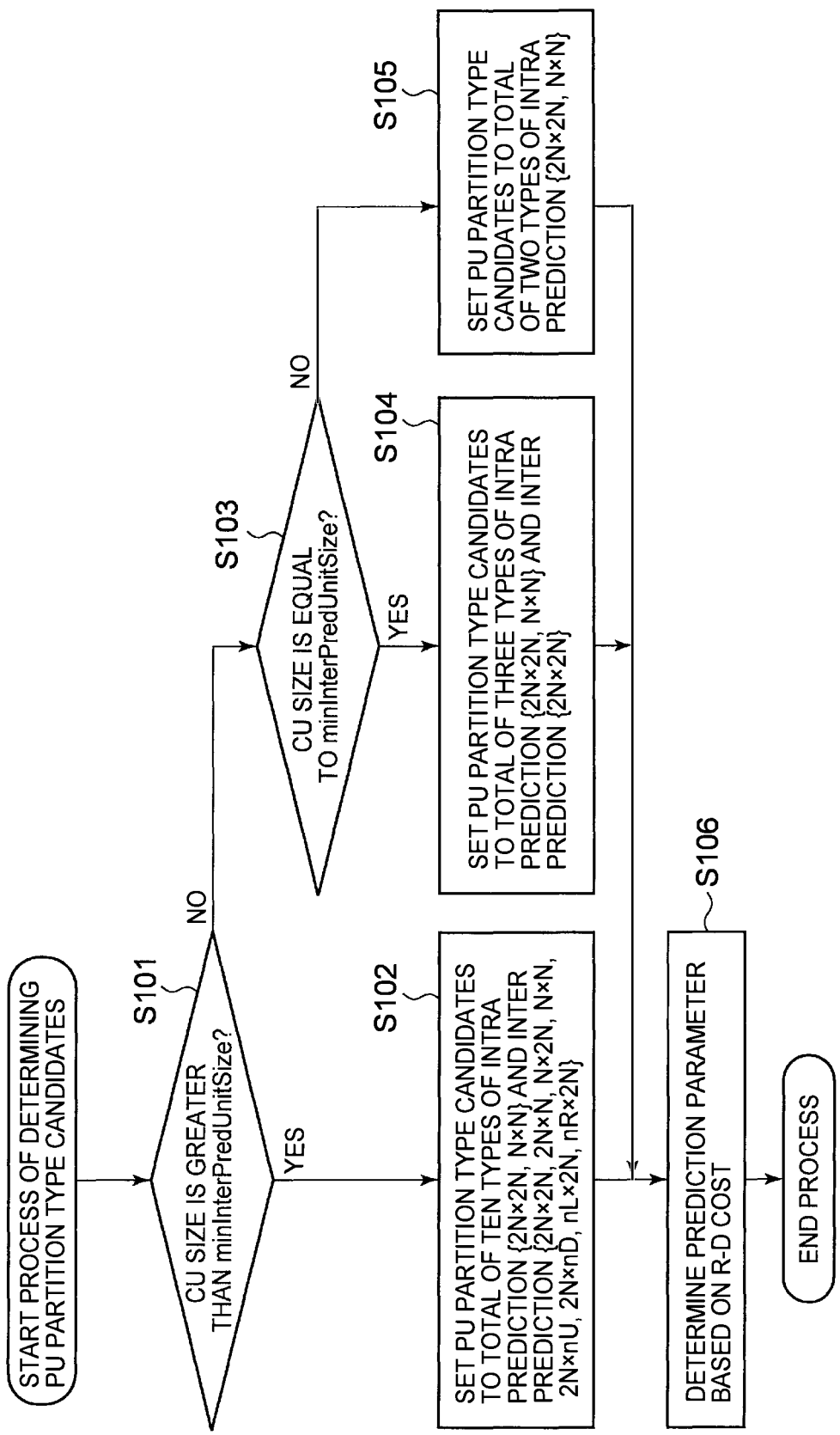
FIG. 2 is a flowchart showing a process of determining PU partition type candidates.

FIG. 2 is a flowchart showing the operation of the encoding controller 107 in the exemplary embodiment to determine PU partition type candidates.

As shown in FIG. 2, when determining in step S101 that the CU size of a CU to be encoded is greater than minInterPredUnitSize, the encoding controller 107 sets PU partition type candidates in step S102 to a total of ten types of intra prediction {2N×2N, N×N} and inter prediction {2N×2N, 2N×N, N×2N, N×N, 2N×nU, 2N×nD, nL×2N, nR×2N}, and determines in step S106 a prediction parameter based on the R-D cost.

When determining in step S101 that the CU size of the CU to be encoded is less than or equal to minInterPredUnitSize, the encoding controller 107 proceeds to step S103.

When determining in step S103 that the CU size of the CU to be encoded is equal to minInterPredUnitSize, the encoding controller 107 sets PU partition type candidates in step S104 to a total of three types of intra prediction {2N×2N, N×N} and inter prediction {2N×2N}, and determines in step S106 a prediction parameter based on the R-D cost.

When determining in step S103 that the CU size of the CU to be encoded is less than minInterPredUnitSize, the encoding controller 107 sets PU partition type candidates in step S105 to two types of intra prediction {2N×2N, N×N}, and determines in step S106 the optimum PU partition type as a prediction parameter based on the R-D cost.

The predictor 105 selects a prediction signal corresponding to the prediction parameters of each CU determined by the encoding controller 107.

The prediction signal supplied from the predictor 105 is subtracted from input video of each CU in a shape determined by the encoding controller 107 to generate a prediction error image, and the prediction error image is input to the transformer/quantizer 101.

The transformer/quantizer 101 frequency-transforms the prediction error image to obtain a frequency transform coefficient.

The transformer/quantizer 101 further quantizes the frequency transform coefficient with a predetermined quantization step width Qs to obtain a transform quantization value.

The entropy encoder 102 entropy-encodes split_coding_unit_flag (see FIG. 22) supplied from the encoding controller 107, the prediction parameters, and the transform quantization value supplied from the transformer/quantizer 101.

The inverse transformer/inverse quantizer 103 inverse-quantizes the transform quantization value with the predetermined quantization step width Qs. The inverse transformer/inverse quantizer 103 further performs inverse frequency transform of the frequency transform coefficient obtained by the inverse quantization. The prediction signal is added to the reconstructed prediction error image obtained by the inverse frequency transform, and the result is supplied to the buffer 104.

The multiplexer 106 multiplexes and outputs the information on the minimum inter-PU size (min_inter_pred_unit_hierarchy_depth) and output data of the entropy encoder 102. According to 4.1.2 Sequence parameter set RBSP syntax in NPL 2, the multiplexer 106 multiplexes log 2_min_coding_unit_size_minus3 syntax and min_inter_pred_unit_hierarchy_depth syntax after max_coding_unit_hierarchy_depth syntax in a sequence parameter set as listed in FIG. 3 (base-2 log (logarithm) of a value obtained by dividing minInterPredUnitSize by the SCU size, i.e. 0 in the exemplary embodiment). The log 2_min_coding_unit_size_minus3 syntax and the max_coding_unit_hierarchy_depth syntax are information for determining an SCU size (minCodingUnitSize) and an LCU size (maxCodingUnitSize), respectively. MinCodingUnitSize and maxCodingUnitSize are respectively calculated as follows.

minCodingUnitSize=1<<(log 2_min_coding_unit_size_minus3+3)

maxCodingUnitSize=1<<(log 2_min_coding_unit_size_minus3+3+max_coding_unit_hierarchy_depth)

The min_inter_pred_unit_hierarchy_depth syntax and minCodingUnitSize have the following relation.

min_inter_pred_unit_hierarchy_depth=log$_2$(minInterPredUnitSize/minCodingUnitSize)

Based on the operation described above, the video encoding device according to this invention generates a bitstream.

Based on a predetermined minimum inter-PU size and a CU size of a CU to be encoded, the video encoding device in the exemplary embodiment controls the inter-PU partition of the CU to be encoded so that no inter PU the size of which is less than the minimum inter-PU size will not come into existence.

The memory bandwidth is reduced by preventing any inter PU the size of which is less than the minimum inter-PU size from coming into existence. Further, since the number of inter-PU partition type syntaxes to be signaled is reduced by preventing any inter PU the size of which is less than the minimum inter-PU size from coming into existence, the percentage of the amount of code of a PU header in the bitstream is reduced, and hence the quality of video is improved.

The encoding control means in the video encoding device of the exemplary embodiment controls inter-PU partitions based on the predetermined minimum inter-PU size set from the outside. As an example, the encoding control means controls inter-PU partition types other than 2N×2N to be used only in CUs of CU sizes greater than a predetermined size. Therefore, since the probability of occurrence of the 2N×2N inter-PU partition increases to reduce entropy, the efficiency of entropy-encoding is improved. Thus, the quality of compressed video can be maintained while reducing the memory bandwidth.

Likewise, for video decoding, the video encoding device in the exemplary embodiment includes means for embedding, in a bitstream, information on the predetermined minimum inter-PU size set from the outside so that the inter-PU partition type syntax can be parsed from the bitstream. Thus, since the predetermined size is signaled to the video decoding device, the interoperability of the video encoding device and the video decoding device can be enhanced.

Exemplary Embodiment 2

A video encoding device in Exemplary Embodiment 2 includes: encoding control means for controlling an inter-PU partition type based on a predetermined minimum inter-PU size set from the outside and for controlling entropy-encoding of an inter-PU partition type syntax based on the above predetermined minimum inter-PU size; and means for embedding, in a bitstream, information on the minimum inter-PU size to signal the information on the above minimum inter-PU size to a video decoding device.

In this exemplary embodiment, it is assumed that the CU size of a CU to transmit the inter-PU partition type syntax is greater than the above minimum inter-PU size (minInterPredUnitSize). It is also assumed in the exemplary embodiment that available CU sizes are 128, 64, 32, 16, and 8 (i.e., the LCU size is 128 and the SCU size is 8), and minInterPredUnitSize is 8. Thus, in the exemplary embodiment, the CU sizes for embedding the inter-PU partition type syntax in the bitstream are 128, 64, 32, and 16.

It is further assumed in the exemplary embodiment that information on the minimum inter-PU size (min_inter_pred_unit_hierarchy_depth) is base-2 log (logarithm) of a value obtained by dividing the minimum inter-PU size (8) by the SCU size (8). Thus, in the exemplary embodiment, the value of min_inter_pred_unit_hierarchy_depth multiplexed into the bitstream is $0(=\log_2(8/8))$.

The structure of the video encoding device in the exemplary embodiment is the same as the structure of the video encoding device in Exemplary Embodiment 1 shown in FIG. 1.

As shown in FIG. 1, the video encoding device in this exemplary embodiment differs from the video encoding device shown in FIG. 15 in that minInterPredUnitSize is supplied to the encoding controller 107 to transmit an inter-PU partition type syntax in a CU size greater than minInterPredUnitSize, and minInterPredUnitSize is also supplied to the multiplexer 106 to signal minInterPredUnitSize to the video decoding device.

The encoding controller 107 has the predictor 105 calculate the R-D cost calculated from a coding distortion (the energy of an error image between an input signal and a reconstructed picture) and a generated bit count. The encoding controller 107 determines a CU splitting pattern in which the R-D cost is minimized (the splitting pattern determined by split_coding_unit_flag as shown in FIG. 22), and prediction parameters of each CU. The encoding controller 107 supplies the determined split_coding_unit_flag and prediction parameters of each CU to the predictor 105 and the entropy encoder 102. The prediction parameters are information associated with prediction of a CU to be encoded, such as prediction mode (pred_mode), intra-PU partition type (intra_split_flag), intra prediction direction, inter-PU partition type (inter_partitioning_idc), and motion vector.

Like in Exemplary Embodiment 1, the encoding controller 107 in the exemplary embodiment selects the optimum PU partition type as a prediction parameter for a CU whose size is greater than minInterPredUnitSize from a total of ten types of intra prediction {2N×2N, N×N} and inter prediction {2N×2N, 2N×N, N×2N, N×N, 2N×nU, 2N×nD, nL×2N, nR×2N}. For a CU whose size is equal to minInterPredUnitSize, the encoding controller 107 selects the optimum PU partition type as a prediction parameter from a total of three types of intra prediction {2N×2N, N×N} and inter prediction {2N×2N}. For a CU whose size is less than minInterPredUnitSize, the encoding controller 107 selects the optimum PU partition type as a prediction parameter from intra prediction {2N×2N, N×N}.

When the prediction mode of a CU to be entropy-encoded is inter prediction and the CU size is less than or equal to minInterPredUnitSize, the encoding controller 107 in the exemplary embodiment controls the entropy encoder 102 not to entropy-encode inter_partitioning_idc.

The predictor 105 selects a prediction signal corresponding to the prediction parameters of each CU determined by the encoding controller 107.

The prediction signal supplied from the predictor 105 is subtracted from input video of each CU in a shape determined by the encoding controller 107 to generate a prediction error image, and the prediction error image is input to the transformer/quantizer 101.

The transformer/quantizer 101 frequency-transforms the prediction error image to obtain a frequency transform coefficient.

The transformer/quantizer 101 further quantizes the frequency transform coefficient with a predetermined quantization step width Qs to obtain a transform quantization value.

The entropy encoder 102 entropy-encodes split_coding_unit_flag (see FIG. 22) supplied from the encoding controller 107, the prediction parameters, and the transform quantization value supplied from the transformer/quantizer 101. As mentioned above, when the prediction mode of a CU to be entropy-encoded is inter prediction and the CU size is less than or equal to minInterPredUnitSize, the entropy encoder 102 in the exemplary embodiment does not entropy-encode inter_partitioning_idc.

The inverse transformer/inverse quantizer 103 inverse-quantizes the transform quantization value with the predetermined quantization step width Qs. The inverse transformer/inverse quantizer 103 further performs inverse frequency transform of the frequency transform coefficient obtained by the inverse quantization. The prediction signal is added to the reconstructed prediction error image obtained by the inverse frequency transform, and the result is supplied to the buffer 104.

The multiplexer 106 multiplexes and outputs the information on the minimum inter-PU size (min_inter_pred_unit_hierarchy_depth) and output data of the entropy encoder 102. According to 4.1.2 Sequence parameter set RBSP syntax in NPL 2, the multiplexer 106 multiplexes log 2_min_coding_unit_size_minus3 syntax and min_inter_predunit_hierarchy_depth syntax after max_coding_unit_hierarchy_depth syntax in a sequence parameter set as listed in FIG. 3 (base-2 log (logarithm) of a value obtained by dividing minInterPredUnitSize by the SCU size, i.e. 0 in the exemplary embodiment). The log 2_min_coding_unit_size_minus3 syntax and the max_coding_unit_hierarchy_depth syntax are information for determining an SCU size (minCodingUnitSize) and an LCU size (maxCodingUnitSize), respectively. MinCodingUnitSize and maxCodingUnitSize are respectively calculated as follows.

$$\text{minCodingUnitSize}=1<<(\log 2\_min\_coding\_unit\_size\_minus3+3)$$

$$\text{maxCodingUnitSize}=1<<(\log 2\_min\_coding\_unit\_size\_minus3+3+max\_coding\_unit\_hierarchy\_depth)$$

The min_inter_pred_unit_hierarchy_depth syntax and minCodingUnitSize have the following relation.

$$\text{min\_inter\_pred\_unit\_hierarchy\_depth}=\log_2(\text{minInterPredUnitSize/minCodingUnitSize})$$

Based on the operation described above, the video encoding device in the exemplary embodiment generates a bitstream.

Figures 3, 4:
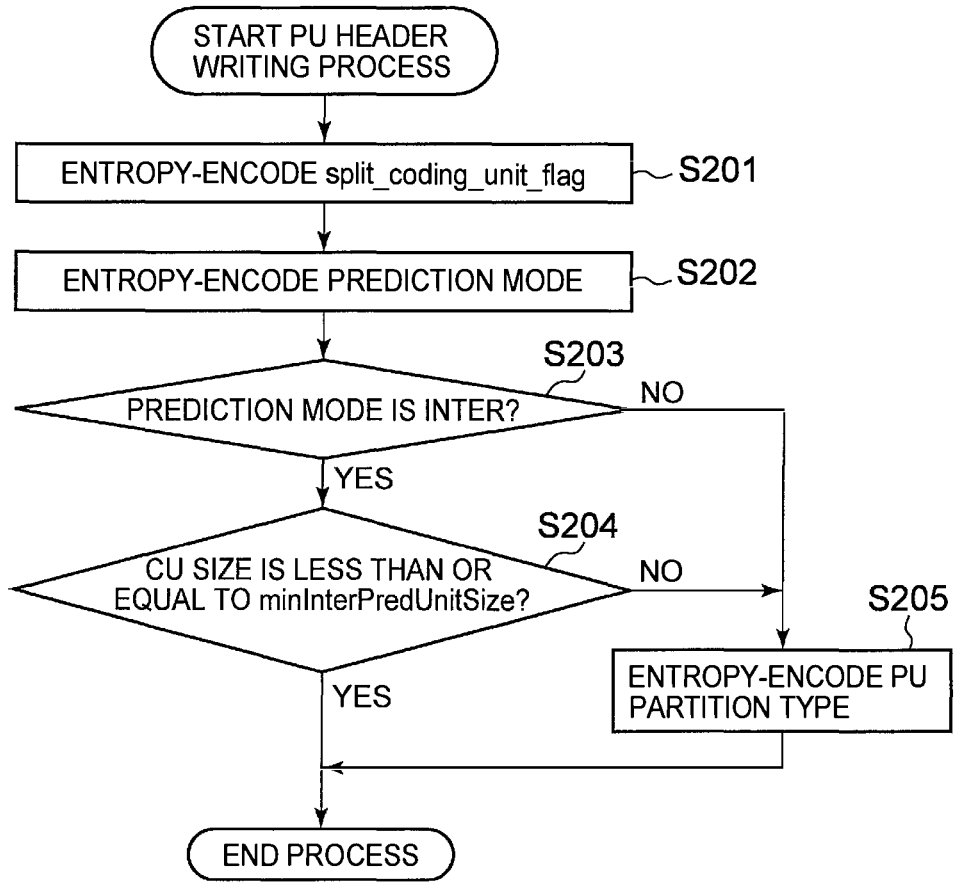
FIG. 3 is an explanatory diagram of a list indicative of information on the minimum inter-PU size in a sequence parameter set.
FIG. 4 is a flowchart showing a PU header writing operation.

Referring next to a flowchart of FIG. 4, description is made of an operation of writing the inter-PU partition type syntax that is a feature of the exemplary embodiment.

As shown in FIG. 4, the entropy encoder 102 entropy-encodes split_coding_unit_flag in step S201. The entropy encoder 102 further entropy-encodes the prediction mode in step S202, i.e., the entropy encoder 102 entropy-encodes pred_mode syntax. When determining in step S203 that the prediction mode of a CU to be encoded is inter prediction and determining in step S204 that the CU size is less than or equal to minInterPredUnitSize, the encoding controller 107 controls the entropy encoder 102 to skip entropy-encoding of inter_partitioning_idc syntax. When determining in step S203 that the prediction mode of the CU to be encoded is intra prediction, or when determining in step S204 that the CU size is greater than minInterPredUnitSize, the encoding controller 107 controls the entropy encoder 102 to entropy-encode, in step S205, PU partition type information on the CU to be encoded.

According to 4.1.10 Prediction unit syntax in NPL 2, the above-mentioned pred_mode syntax and inter_partitioning_idc syntax are signaled as represented in a list shown in FIG. 5. The exemplary embodiment features that the inter_partitioning_idc syntax is signaled only in PU headers of CUs greater in size than minInterPredUnitSize under the following condition: "if (currPredUnitSize>minInterPredUnitSize)."

When the CU size of the CU to be encoded is less than or equal to the predetermined minimum inter-PU size, the video encoding device in the exemplary embodiment does not entropy-encode the inter-PU partition type syntax in the PU header layer of the CU to be encoded to reduce the number of inter-PU partition type syntaxes to be signaled. Since the reduction in the number of inter-PU partition type syntaxes to be signaled reduces the percentage of the amount of code of a PU header in the bitstream, the quality of video is further improved.

When the CU size of the CU to be encoded exceeds the predetermined minimum inter-PU size, the video encoding device in the exemplary embodiment sets, in a predetermined inter-PU partition type, the inter-PU partition type syntax in the PU header layer of the CU to be encoded, and entropy-encodes the inter-PU partition type so that no inter PU the size of which is less than the minimum inter-PU size will not come into existence. The memory bandwidth is reduced by preventing any inter PU the size of which is less than the minimum inter-PU size from coming into existence.

Exemplary Embodiment 3

A video decoding device in Exemplary Embodiment 3 decodes a bitstream generated by the video encoding device in Exemplary Embodiment 2.

The video decoding device in this exemplary embodiment includes: means for de-multiplexing minimum inter-PU size information multiplexed into a bitstream; CU size determination means for determining a predetermined CU size, from which an inter-PU partition type is parsed, based on the de-multiplexed minimum inter-PU size information; and parsing means for parsing the inter-PU partition type from the bitstream in the CU size determined by the CU size determination means.

Figure 6:
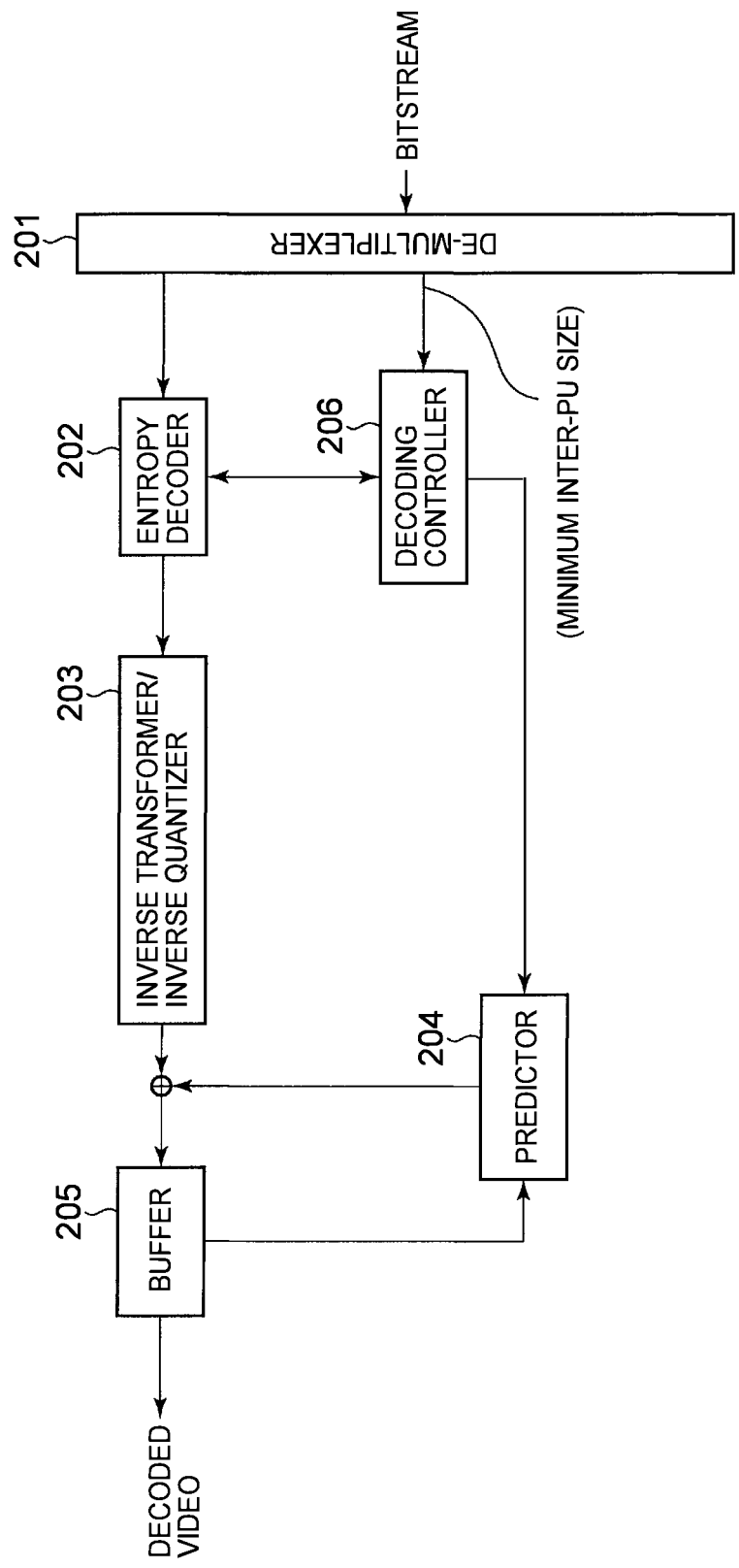
FIG. 6 is a block diagram of a video decoding device in Exemplary Embodiment 2.

As shown in FIG. 6, the video decoding device in the exemplary embodiment includes a de-multiplexer 201, an entropy decoder 202, an inverse transformer/inverse quantizer 203, a predictor 204, a buffer 205, and a decoding controller 206.

The de-multiplexer 201 de-multiplexes an input bitstream and extracts minimum inter-PU size information and an entropy-encoded video bitstream. The de-multiplexer 201 de-multiplexes log 2_min_coding_unit_size_minus3 syntax and min_inter_pred_unit_hierarchy_depth syntax after max_coding_unit_hierarchy_depth syntax in sequence parameters as listed in FIG. 3. The de-multiplexer 201 further uses the de-multiplexed syntax values to determine a minimum inter-PU size (minInterPredUnitSize), in which the inter-PU partition type syntax (inter_partitioning_idc syntax) is transmitted, as follows.

minInterPredUnitSize=1<<(log 2_min_coding_unit_size_minus3+3+min_inter_pred_unit_hierarchy_depth)

In other words, the de-multiplexer 201 in the exemplary embodiment also plays a role in determining the CU size, in which the inter-PU partition type syntax is parsed, based on the de-multiplexed minimum inter-PU size information.

The de-multiplexer 201 further supplies the minimum inter-PU size to the decoding controller 206.

The entropy decoder 202 entropy-decodes the video bitstream. The entropy decoder 202 supplies an entropy-decoded transform quantization value to the inverse transformer/inverse quantizer 203. The entropy decoder 202 supplies entropy-decoded split_coding_unit_flag and prediction parameters to the decoding controller 206.

When the prediction mode of a CU to be decoded is inter prediction and the CU size is minInterPredUnitSize, the decoding controller 206 in the exemplary embodiment controls the entropy decoder 202 to skip entropy-decoding of the inter-PU partition type syntax of the CU to be decoded. The decoding controller 206 further sets, to 2N×2N, the inter-PU partition type of the CU to be decoded. When the CU size of the CU to be decoded is less than minInterPredUnitSize, the prediction mode of the CU is only intra prediction.

The inverse transformer/inverse quantizer 203 inverse-quantizes transform quantization values of luminance and color difference with a predetermined quantization step width. The inverse transformer/inverse quantizer 203 further performs inverse frequency transform of a frequency transform coefficient obtained by the inverse quantization.

After the inverse frequency transform, the predictor 204 generates a prediction signal using an image of a reconstructed picture stored in the buffer 205 based on the prediction parameters supplied from the decoding controller 206.

The prediction signal supplied from the predictor 204 is added to a reconstructed prediction error image obtained by the inverse frequency transform performed by the inverse transformer/inverse quantizer 203, and the result is supplied to the buffer 205 as a reconstructed picture.

The reconstructed picture stored in the buffer 205 is then output as a decoded image.

Based on the operation described above, the video decoding device in the exemplary embodiment generates a decoded image.

Figure 7:
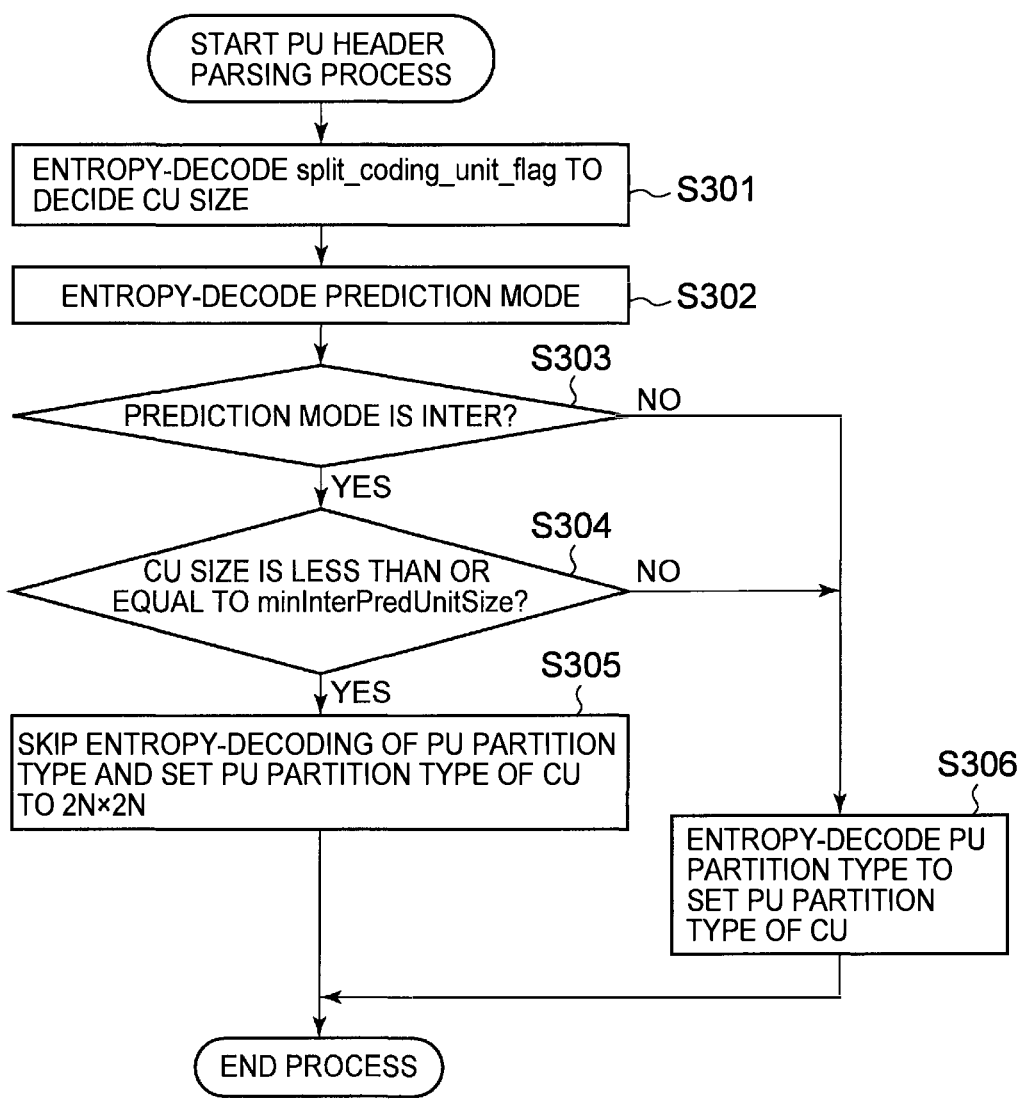
FIG. 7 is a flowchart showing a PU header parsing operation.

Referring next to a flowchart of FIG. 7, description is made of an operation of parsing the inter-PU partition type syntax that is a feature of the exemplary embodiment.

As shown in FIG. 7, the entropy decoder 202 entropy-decodes split_coding_unit_flag to decide the CU size in step S301. In step S302, the entropy decoder 202 entropy-decodes the prediction mode. In other words, the entropy decoder 202 entropy-decodes pred_mode syntax. When determining in step S303 that the prediction mode is inter prediction and determining in step S304 that the decided CU size is less than or equal to minInterPredUnitSize, the decoding controller 206 controls the entropy decoder 202 in step S305 to skip entropy-decoding of the inter-PU partition type and to set the PU partition type of the CU to 2N×2N (inter_partitioning_idc=0).

When determining in step S303 that the prediction mode is intra prediction, or when determining in step S304 that the decided CU size is greater than minInterPredUnitSize, the decoding controller 206 controls the entropy decoder 202 in step S306 not to skip entropy-decoding of the PU partition type of the CU to be decoded and to set the PU partition type of the CU to a PU partition type obtained as a result of the entropy-decoding.

The video encoding device in Exemplary Embodiment 1 and Exemplary Embodiment 2 can multiplex the minimum inter-PU size information (min_inter_pred_unit_hierarchy_depth) used in Exemplary Embodiment 1 into a picture parameter set or a slice header as represented in a list shown in FIG. 8 or a list shown in FIG. 9. Similarly, the video decoding device in this exemplary embodiment can de-multiplex the min_inter_pred_unit_hierarchy_depth syntax from the picture parameter set or the slice header.

The video encoding device in Exemplary Embodiment 1 and Exemplary Embodiment 2 may set the min_inter_pred_unit_hierarchy_depth syntax as base-2 log (logarithm) of a value obtained by dividing the LCU size (maxCodingUnitSize) by the minimum inter-PU size (minInterPredUnitSize), i.e., the following equation may be used.

min_inter_pred_unit_hierarchy_depth=log 2(maxCodingUnitSize/minInterPredUnitSize)

In this case, the video decoding device in this exemplary embodiment can calculate the minimum inter-PU size based on the min_inter_pred_unit_hierarchy_depth syntax as follows.

minInterPredUnitSize=1<<(log 2_min_coding_unit_size_minus3+3+max_coding_unit_hierarchy_depth−min_inter_pred_unit_hierarchy_depth)

In the video decoding device in this exemplary embodiment, since no inter PU the size of which is less than the minimum inter-PU size does not come into existence, the memory bandwidth is reduced.

Exemplary Embodiment 4

A video decoding device in Exemplary Embodiment 4 decodes a bitstream generated by the video encoding device in Exemplary Embodiment 1.

The video decoding device in this exemplary embodiment includes: means for de-multiplexing minimum inter-PU size information multiplexed into a bitstream; and error detection means for detecting, based on the de-multiplexed minimum inter-PU size information, an error in an access unit accessing the bitstream including a CU to be decoded. As defined in 3.1 access unit of NPL 1, the access unit is the unit of storing coded data for one picture. The error means violation of restrictions based on the number of motion vectors allowed per predetermined area.

Figure 10:
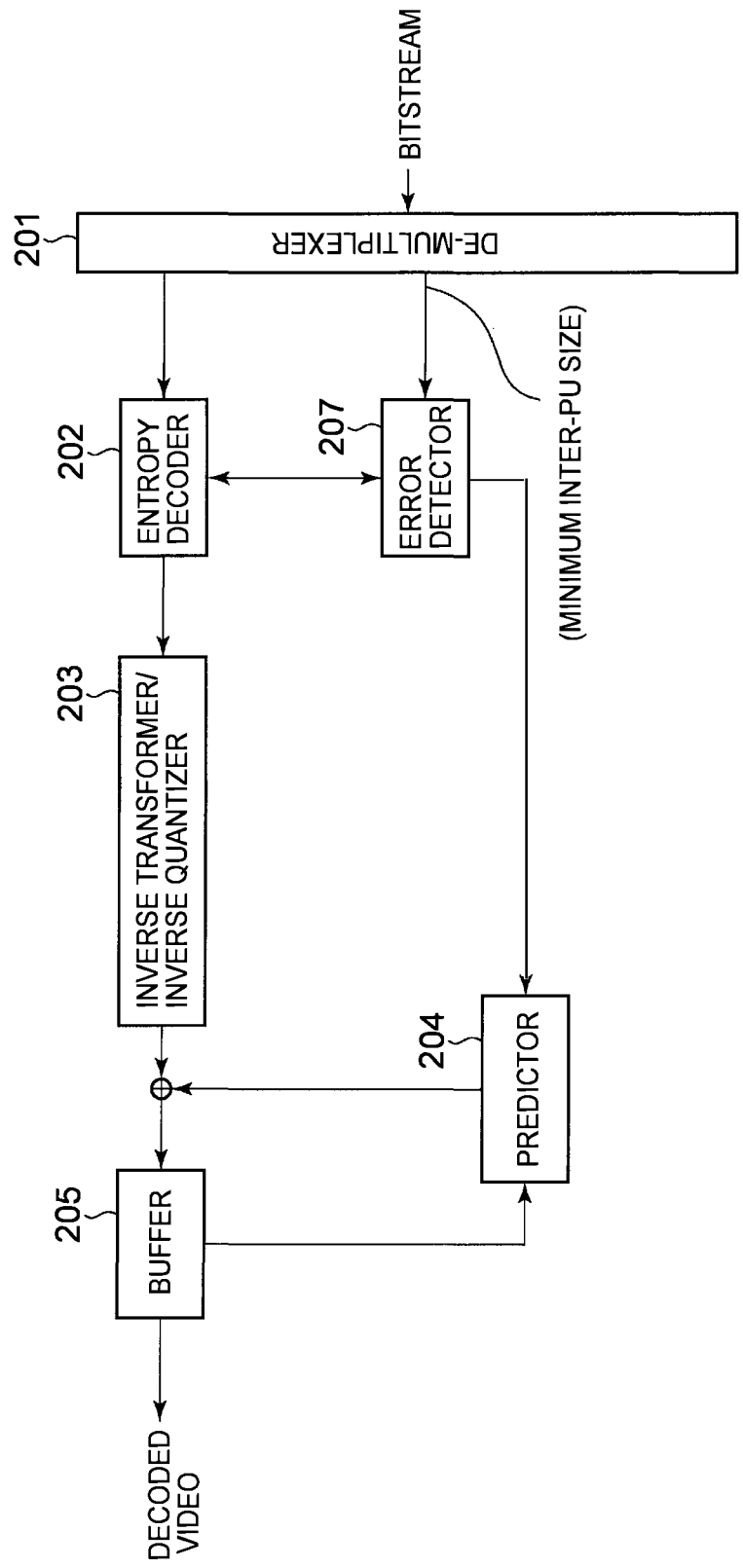
FIG. 10 is a block diagram of a video decoding device in Exemplary Embodiment 4.

As shown in FIG. 10, the video decoding device in the exemplary embodiment includes a de-multiplexer 201, an entropy decoder 202, an inverse transformer/inverse quantizer 203, a predictor 204, a buffer 205, and an error detector 207.

The de-multiplexer 201 operates the same way as the de-multiplexer 201 in Exemplary Embodiment 3 to de-multiplex an input bitstream and extract minimum inter-PU size information and an entropy-encoded video bitstream. The de-multiplexer 201 further determines the minimum inter-PU size and supplies the minimum inter-PU size to the error detector 207.

The entropy decoder 202 entropy-decodes the video bitstream. The entropy decoder 202 supplies an entropy-decoded transform quantization value to the inverse transformer/inverse quantizer 203. The entropy decoder 202 then supplies entropy-decoded split_coding_unit_flag and prediction parameters to the error detector 207.

The error detector 207 performs error detection on the prediction parameters supplied from the entropy decoder 202 based on the minimum inter-PU size supplied from the de-multiplexer 201, and supplies the result to the predictor 204. The error detection operation will be described later. The error detector 207 also plays a role as the decoding controller 206 in Exemplary Embodiment 3.

The inverse transformer/inverse quantizer 203 operates the same way as the inverse transformer/inverse quantizer 203 in Exemplary Embodiment 3.

The predictor 204 generates a prediction signal using an image of a reconstructed picture stored in the buffer 205 based on the prediction parameters supplied from the error detector 207.

The buffer 205 operates the same way as the buffer 205 in Exemplary Embodiment 3.

Based on the operation described above, the video decoding device in the exemplary embodiment generates a decoded image.

Figure 11:
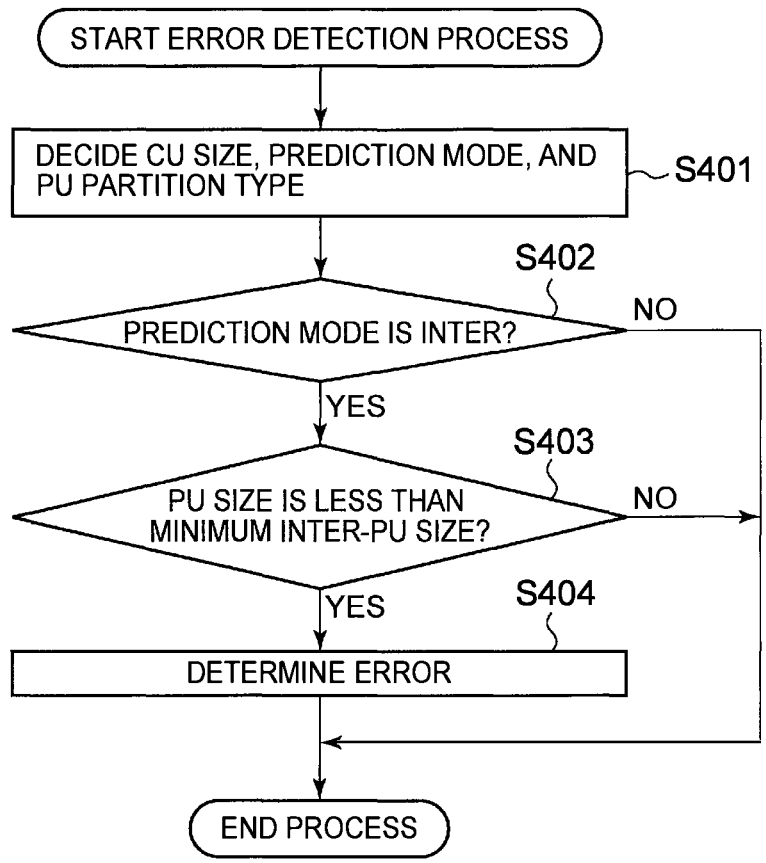
FIG. 11 is a flowchart showing an error detection operation.

Referring to a flowchart of FIG. 11, description is made of the error detection operation of the video decoding device in the exemplary embodiment to detect an error in an access unit accessing a bitstream including a CU to be decoded.

In step S401, the error detector 207 decides the CU size, the prediction mode, and the PU partition type.

In step S402, the error detector 207 determines the prediction mode of a PU of the CU to be decoded. When the prediction mode is intra prediction, the process is ended. When the prediction mode is inter prediction, the procedure proceeds to step S403.

In step S403, the error detector 207 compares the PU size of the CU to be decoded with the minimum inter-PU size. When the PU size of the CU to be decoded is greater than or equal to the minimum inter-PU size, the process is ended. When the PU size of the CU to be decoded is less than the minimum inter-PU size, the procedure proceeds to step S404.

In step S404, the error detector 207 determines that there is an error and notifies the outside of the error. For example, the error detector 207 outputs the address of the CU to be decoded and in which the error has occurred.

According to the above operation, the error detector 207 detects the error in an access unit accessing the bitstream including the CU to be decoded.

Each of the aforementioned exemplary embodiments can be implemented in hardware or in a computer program.

Figure 12:
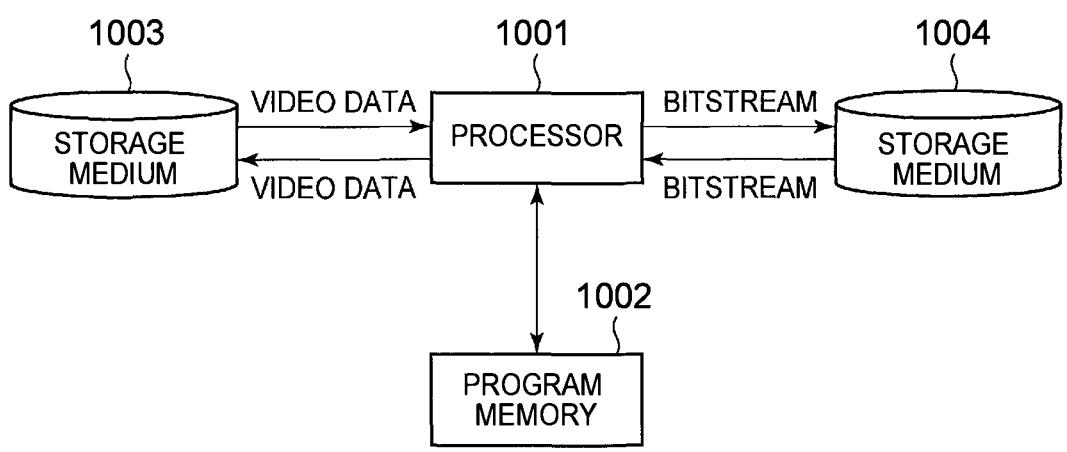
FIG. 12 is a block diagram showing a configuration example of an information processing system capable of implementing the functions of a video encoding device and a video decoding device according to the present invention.

An information processing system shown in FIG. 12 includes a processor 1001, a program memory 1002, a storage medium 1003 for storing video data, and a storage medium 1004 for storing a bitstream. The storage medium 1003 and the storage medium 1004 may be different storage media, or storage areas on the same storage medium. A magnetic medium such as a hard disk can be used as the storage medium.

In the information processing system shown in FIG. 12, a program for carrying out the function of each block (except the buffer block) shown in each of FIG. 1, FIG. 6, and FIG. 10 is stored in the program memory 1002. The processor 1001 performs processing according to the program stored in the program memory 1002 to carry out the functions of the video encoding device or the video decoding device shown in FIG. 1, FIG. 6, or FIG. 10, respectively.

Figure 13:
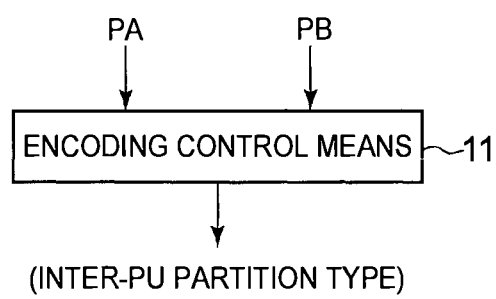
FIG. 13 is a block diagram showing a main part of a video encoding device according to the present invention.

FIG. 13 is a block diagram showing a main part of a video encoding device according to the present invention. As shown in FIG. 13, the video decoding device according to the present invention is a video encoding device for encoding video using inter prediction, including encoding control means 11 (the encoding controller 107 shown in FIG. 1 as an example) for controlling an inter-PU partition type of a CU to be encoded, based on a predetermined minimum inter-PU size (PA) and a CU size (PB) of the CU to be encoded.

Figure 14:
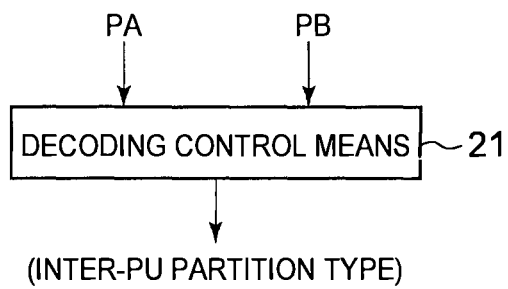
FIG. 14 is a block diagram showing a main part of a video decoding device according to the present invention.

FIG. 14 is a block diagram showing a main part of a video decoding device according to the present invention. As shown in FIG. 14, the video decoding device according to the present invention is a video decoding device for decoding video using inter prediction, including decoding control means 21 (the decoding controller 207 shown in FIG. 6 and FIG. 10 as an example) for controlling an inter-PU partition of a CU to be decoded, based on a predetermined minimum inter-PU size (PA) and a size (PB) of the CU to be decoded.

While the present invention has been described with reference to the exemplary embodiments and examples, the present invention is not limited to the aforementioned exemplary embodiments and examples. Various changes understandable to those skilled in the art within the scope of the present invention can be made to the structures and details of the present invention.

This application claims priority based on Japanese Patent Application No. 2011-4964, filed on Jan. 13, 2011, the disclosures of which are incorporated herein in their entirety.

REFERENCE SIGNS LIST

11 encoding control means
21 decoding control means
101 transformer/quantizer
102 entropy encoder
103 inverse transformer/inverse quantizer
104 buffer
105 predictor
106 multiplexer
107, 108 encoding controller
201 de-multiplexer
202 entropy decoder
203 inverse transformer/inverse quantizer
204 predictor
205 buffer
206 decoding controller
207 error detector
1001 processor
1002 program memory
1003 storage medium
1004 storage medium

The invention claimed is:

1. A video decoding device for decoding video using inter prediction, comprising:
    at least one memory storing instructions; and
    at least one processor configured to process the instructions to:
    determine to perform an entropy-decoding process of decoding a PU (Prediction Unit) partition type syntax of a CU (Coding Unit) to be decoded, based on a prediction mode of the CU to be decoded being an inter prediction mode and a size of the CU to be decoded being equal to a predetermined minimum inter-PU size.

2. A video decoding method for decoding video using inter prediction, comprising:
    determining to perform an entropy-decoding process of decoding an inter-PU (Prediction Unit) partition type syntax of a CU (Coding Unit) to be decoded, based on a prediction mode of the CU to be decoded is-being an inter prediction mode and a size of the CU to be decoded being equal to a predetermined minimum inter-PU size.

* * * * *